US012083545B2

(12) United States Patent
Fradin et al.

(10) Patent No.: US 12,083,545 B2
(45) Date of Patent: Sep. 10, 2024

(54) TAMPER-PROOF AND CONTROLLED DOSING CONTAINER

(71) Applicant: HALEON US HOLDINGS LLC, Wilmington, DE (US)

(72) Inventors: Sylvain Patrice Dominique Fradin, Nyon (CH); Amit Sabherwal, Gurgaon (IN)

(73) Assignee: HALEON US HOLDINGS LLC, Wilmington, DE (US)

( * ) Notice: Subject to any disclaimer, the term of this patent is extended or adjusted under 35 U.S.C. 154(b) by 21 days.

(21) Appl. No.: 17/786,550

(22) PCT Filed: Dec. 17, 2020

(86) PCT No.: PCT/US2020/065514

§ 371 (c)(1),
(2) Date: Jun. 17, 2022

(87) PCT Pub. No.: WO2021/127117

PCT Pub. Date: Jun. 24, 2021

(65) Prior Publication Data

US 2023/0021501 A1 Jan. 26, 2023

Related U.S. Application Data

(60) Provisional application No. 62/949,474, filed on Dec. 18, 2019.

(51) Int. Cl.
*B05B 11/00* (2023.01)
*B05B 11/10* (2023.01)

(52) U.S. Cl.
CPC ...... *B05B 11/0032* (2013.01); *B05B 11/1008* (2023.01); *B05B 11/1059* (2023.01); *B05B 11/108* (2023.01)

(58) Field of Classification Search
CPC ............. B05B 11/0032; B05B 11/1059; B05B 11/108; B05B 11/1008
See application file for complete search history.

(56) References Cited

U.S. PATENT DOCUMENTS 4,384,660 A * 5/1983 Palmisano .......... B05B 11/1059 24/703.1
RE33,247 E * 7/1990 Bossina ................ G01F 11/025 222/320
(Continued)

FOREIGN PATENT DOCUMENTS

DE 202006003005 U1 8/2006
EP 0899206 A1 3/1999
(Continued)

*Primary Examiner* — Frederick C Nicolas

(57) ABSTRACT

A tamper-proof and controlled dosing container including a container to store contents, an actuator coupled with the container, the actuator being depressible in a longitudinal direction to drive the contents held in the container out of a nozzle protruding horizontally from the actuator, and a functional ring. The functional ring further includes a tamper ring portion, a dosing ring portion, and a nozzle plug. The nozzle plug is affixed to the functional ring at one end and includes a protrusion at the opposite end to plug an orifice of the nozzle. The tamper ring portion is removably provided on the functional ring so as to prevent tampering with the contents held in the container. The dosing ring portion is controls the dose dispensed from the container by limiting the vertical movement of the actuator.

6 Claims, 37 Drawing Sheets

(56) References Cited

U.S. PATENT DOCUMENTS

| | | | | | |
|---|---|---|---|---|---|
| 5,445,299 | A * | 8/1995 | Harriman | B05B 11/106 | 222/321.9 |
| 5,662,245 | A * | 9/1997 | Grant | B65D 47/0838 | 222/153.07 |
| 5,664,703 | A * | 9/1997 | Reifenberger | B05B 11/1067 | 222/207 |
| 5,975,370 | A * | 11/1999 | Durliat | B05B 11/106 | 222/384 |
| 7,044,339 | B1 * | 5/2006 | Kuo | B05B 11/1059 | 222/321.9 |
| 7,367,476 | B2 * | 5/2008 | Law | B05B 11/1069 | 222/153.09 |
| 7,654,418 | B2 * | 2/2010 | Law | B05B 11/1001 | 222/321.9 |
| 7,690,535 | B2 * | 4/2010 | Law | B05B 11/1001 | 222/541.9 |
| 8,651,335 | B2 * | 2/2014 | Faneca Llesera | B05B 11/0032 | 222/321.9 |

FOREIGN PATENT DOCUMENTS

| | | | |
|---|---|---|---|
| EP | 174542 | A2 | 2/2007 |
| WO | WO200404045778 | | 6/2004 |
| WO | WO2008131331 | | 10/2008 |

* cited by examiner

TAMPER-PROOF AND CONTROLLED DOSING CONTAINER

This application is a 371 of International Application No. PCT/US2020/065514, filed Dec. 18, 2020, which claims the priority of 62/949,474, filed Dec. 18, 2019.

FIELD OF THE INVENTION

The present invention relates generally to a container for storing contents and in particular, to a container including a functional ring on the container to provide an efficient tamper proof mechanism and controlled dosing of the contents.

BACKGROUND

Containers with pumps provide a hygienic and convenient way to dispense contents contained within the container. Such containers are readily used with pharmaceuticals, cosmetics, and in the food industry. Typically, a user presses down on an actuator, which enables the pump within, and a predetermined amount of contents is dispensed from the nozzle of the actuator. The amount of contents that may be dispensed is constant every time the user presses down on the actuator because the piston travels the same distance with each pump of the container. It is difficult for a user to manually control the distance the piston moves when pressing the actuator. Different contents require a different dose to be dispenses as compared to other contents; therefore, a means by which to alter the amount of contents that is dispensed from a stock container without changing the inner functionality of the pump is highly desirable.

Additionally, maintaining the safety and efficacy of products is a major concern for both companies and consumers, especially in the pharmaceutical, healthcare, and wellness industries. One common solution to these problems to is utilize tamper-proof packaging to ensure product safety. Thus, tamper-proof packaging has been an area of significant research over the past several decades.

SUMMARY

A tamper-proof and controlled dosing container comprising: a container including, a top portion, a bottom portion, and a side wall portion, the space between the bottom portion and the side wall portion defining an interior space to store contents; an actuator coupled with the container, the actuator being depressible in a longitudinal direction to drive the contents held in the interior space of the container out of a nozzle protruding horizontally from the actuator, a functional ring, the functional ring including a tamper ring portion, a dosing ring portion, and a nozzle plug, wherein the nozzle plug extends from the functional ring to the nozzle, and wherein one end of the nozzle plug is permanently affixed to the functional ring and an opposite end of the nozzle plug includes a protrusion for being removably insertable into an orifice of the nozzle.

The present invention further provides that the functional ring is provided on a neck of the container below the nozzle and occupies the entire length of the neck. The present invention further provides that the tamper ring portion is provided on a top surface of the dosing ring portion. Additionally, the tamper ring portion is removably attached to the dosing ring portion and must be removed prior to accessing the contents held in the container for the first time.

The present invention further provides that the actuator abuts the top surface of the dosing ring portion when the actuator is depressed in the longitudinal direction, thereby adjusting the distance the actuator is depressed. Further, the present invention provides that the nozzle plug is attached to the dosing ring portion of the functional ring at one end.

DETAILED DESCRIPTION

Figure 1:
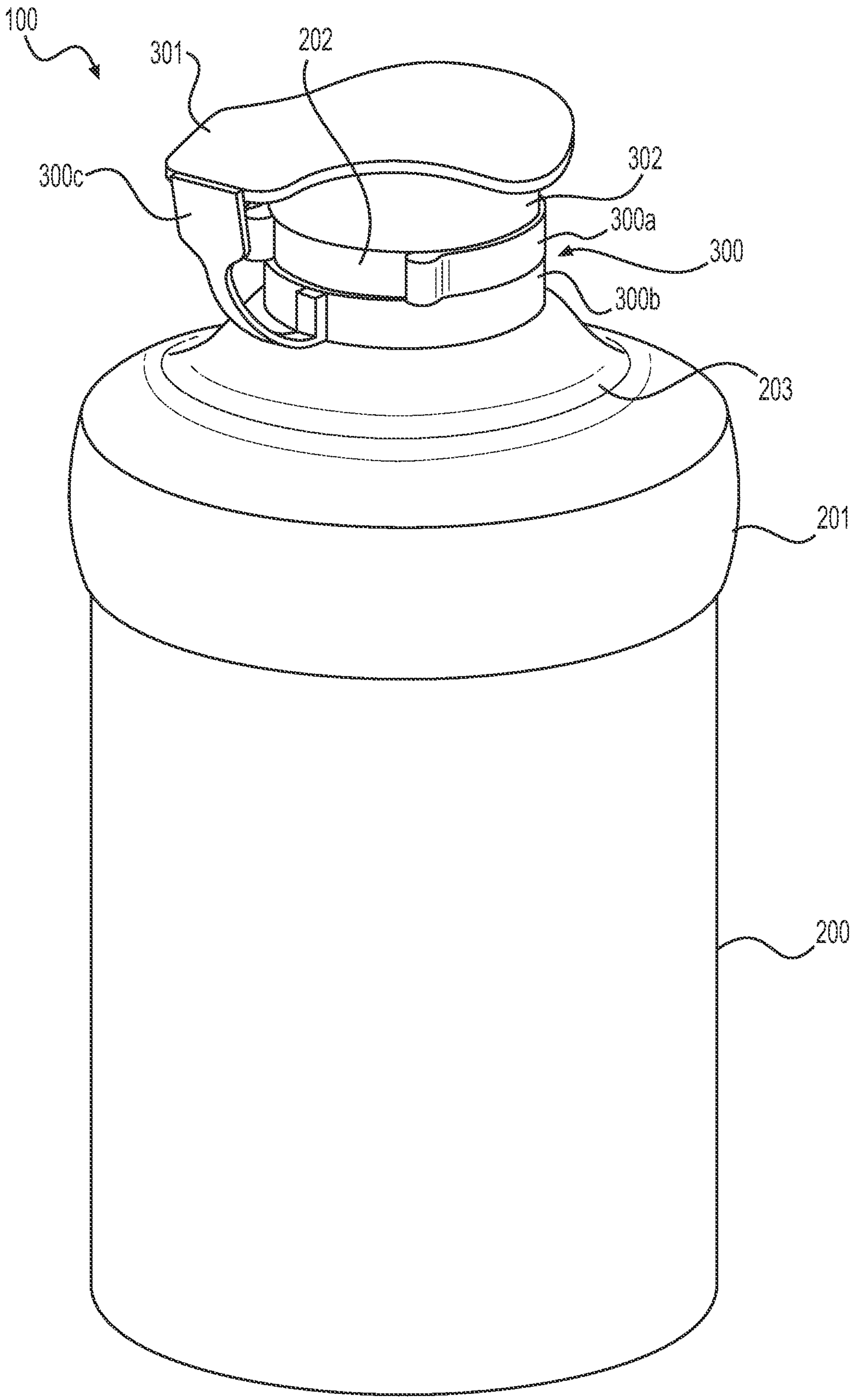
FIG. 1 is a perspective view of a first embodiment of a tamper-proof and controlled dosing container of the present invention.
Figure 2:
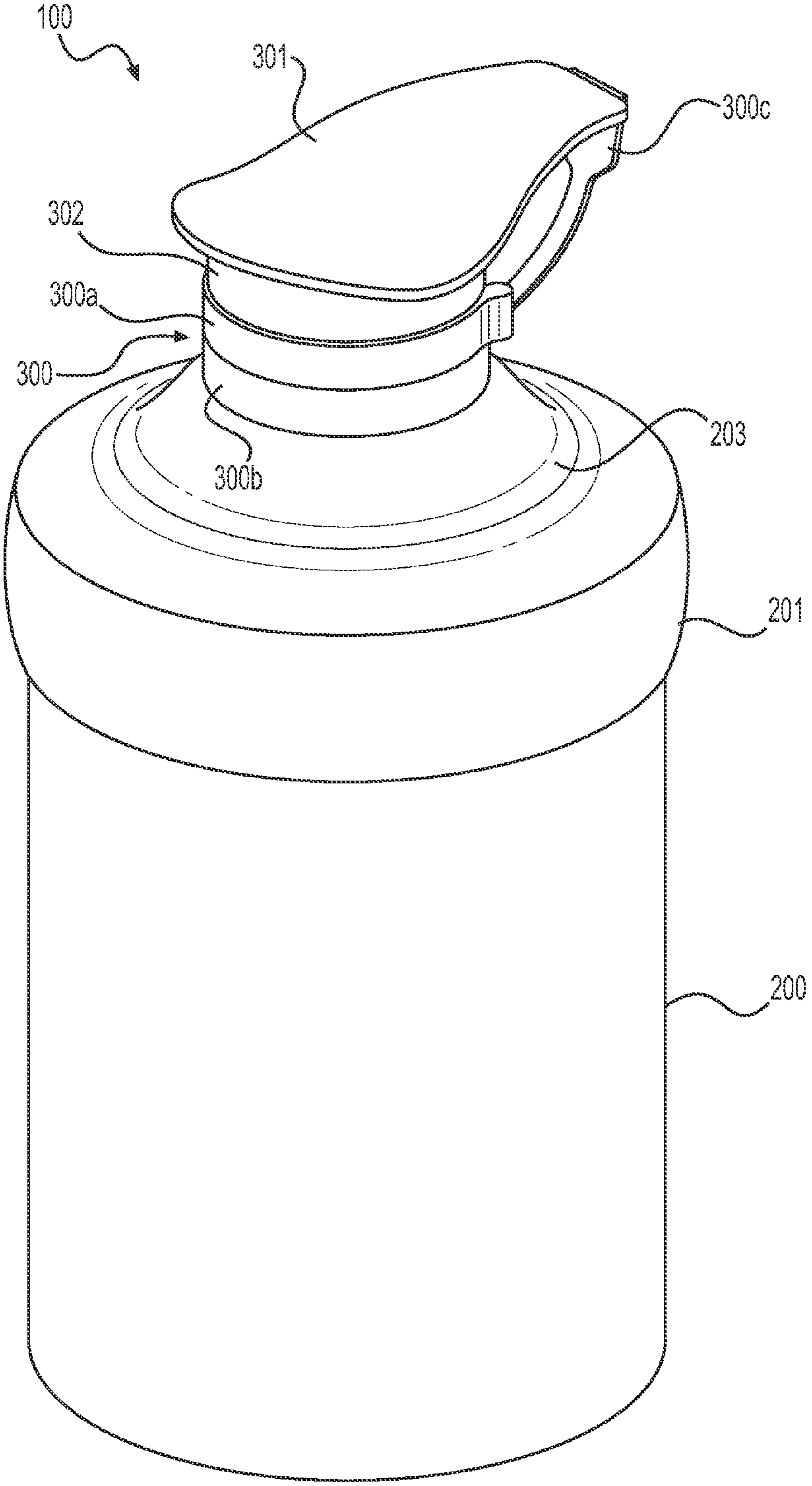
FIG. 2 is a back view of the first embodiment of the tamper-proof and controlled dosing container of the preset invention.
Figure 3:
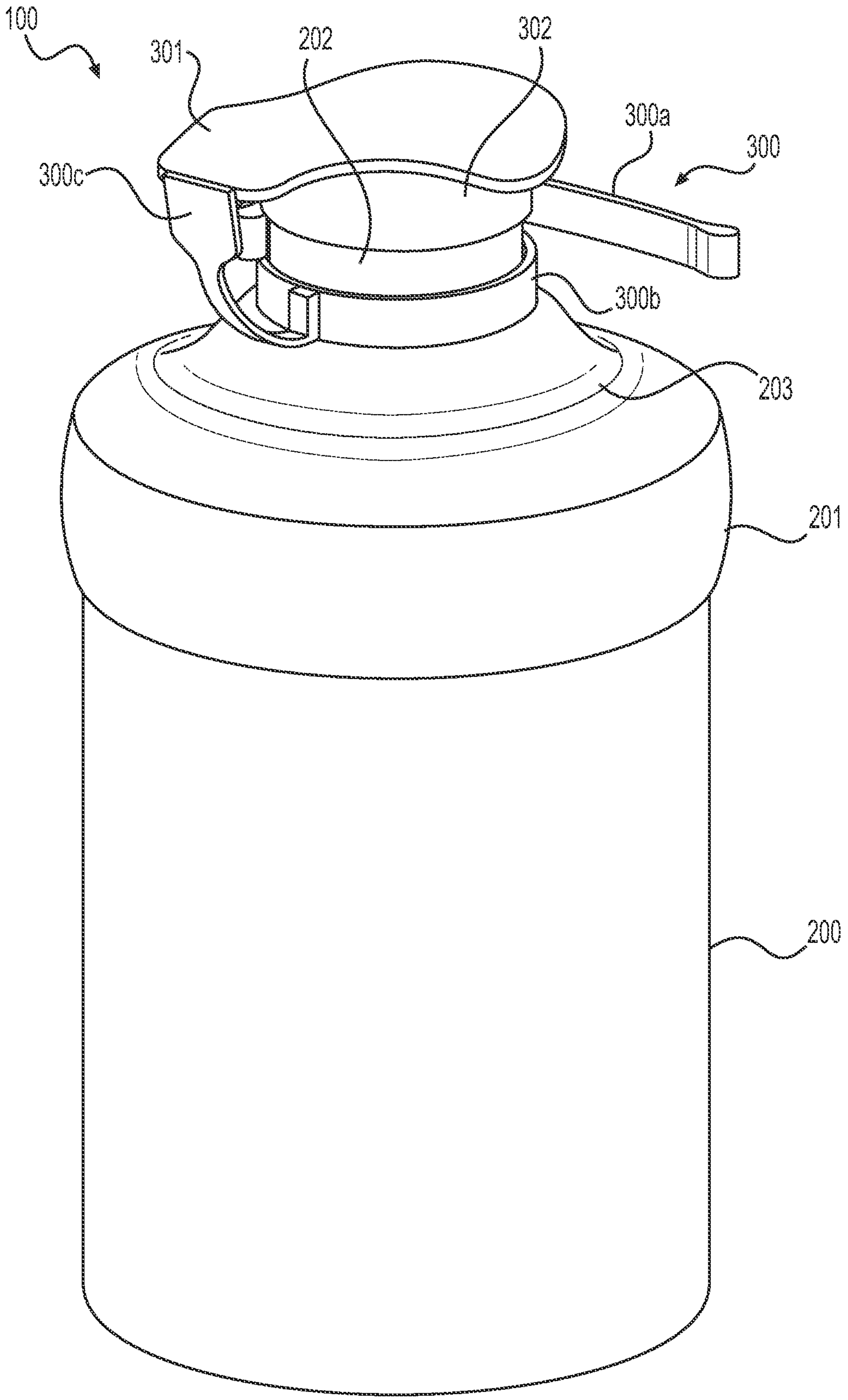
FIG. 3 is a perspective view of the first embodiment of the tamper-proof and controlled dosing container of the present invention with a tamper ring portion being removed.
Figure 4:
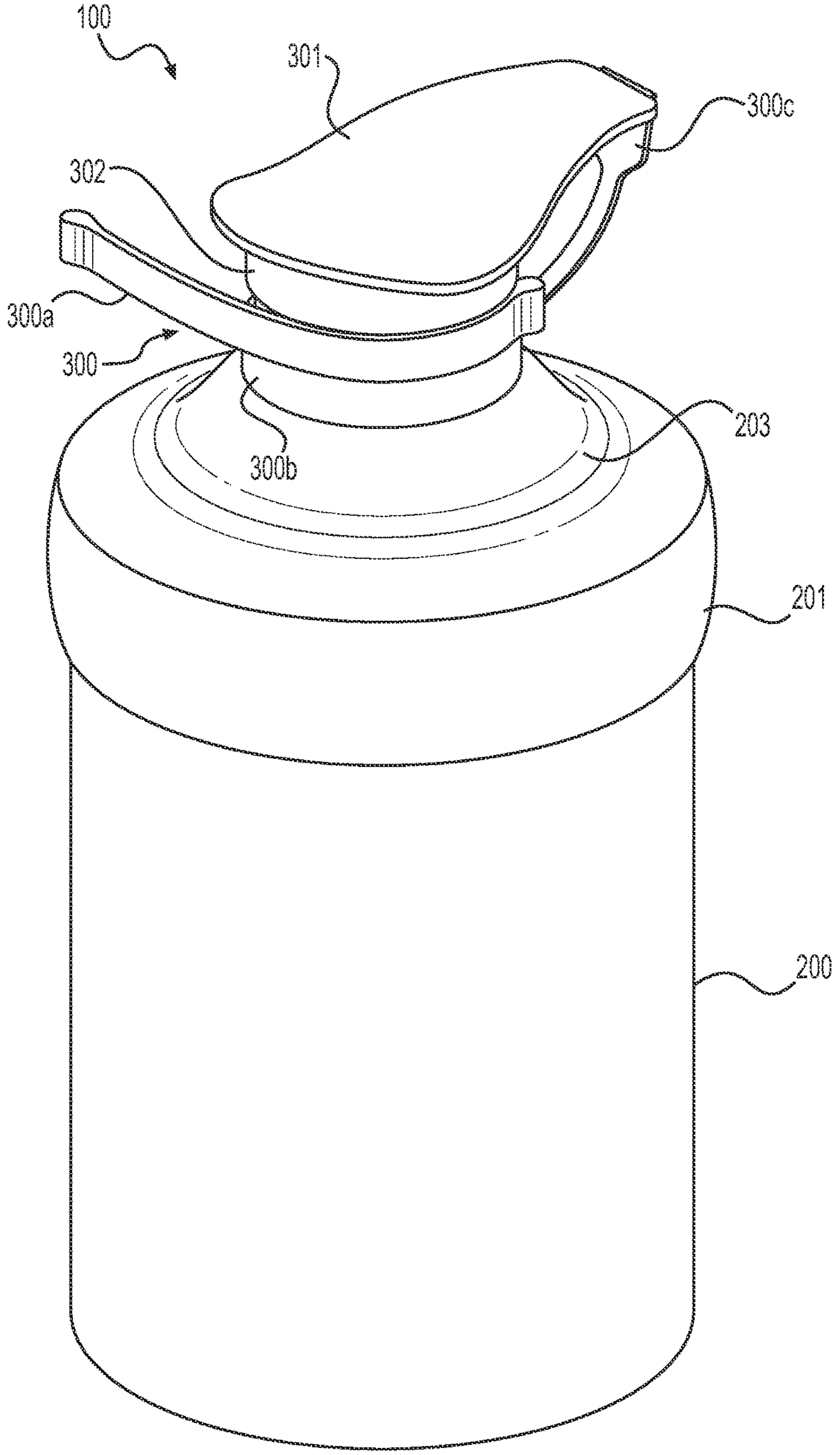
FIG. 4 is a back view of the first embodiment of the tamper-proof and controlled dosing container of the present invention with the tamper ring portion being removed.
Figure 5:
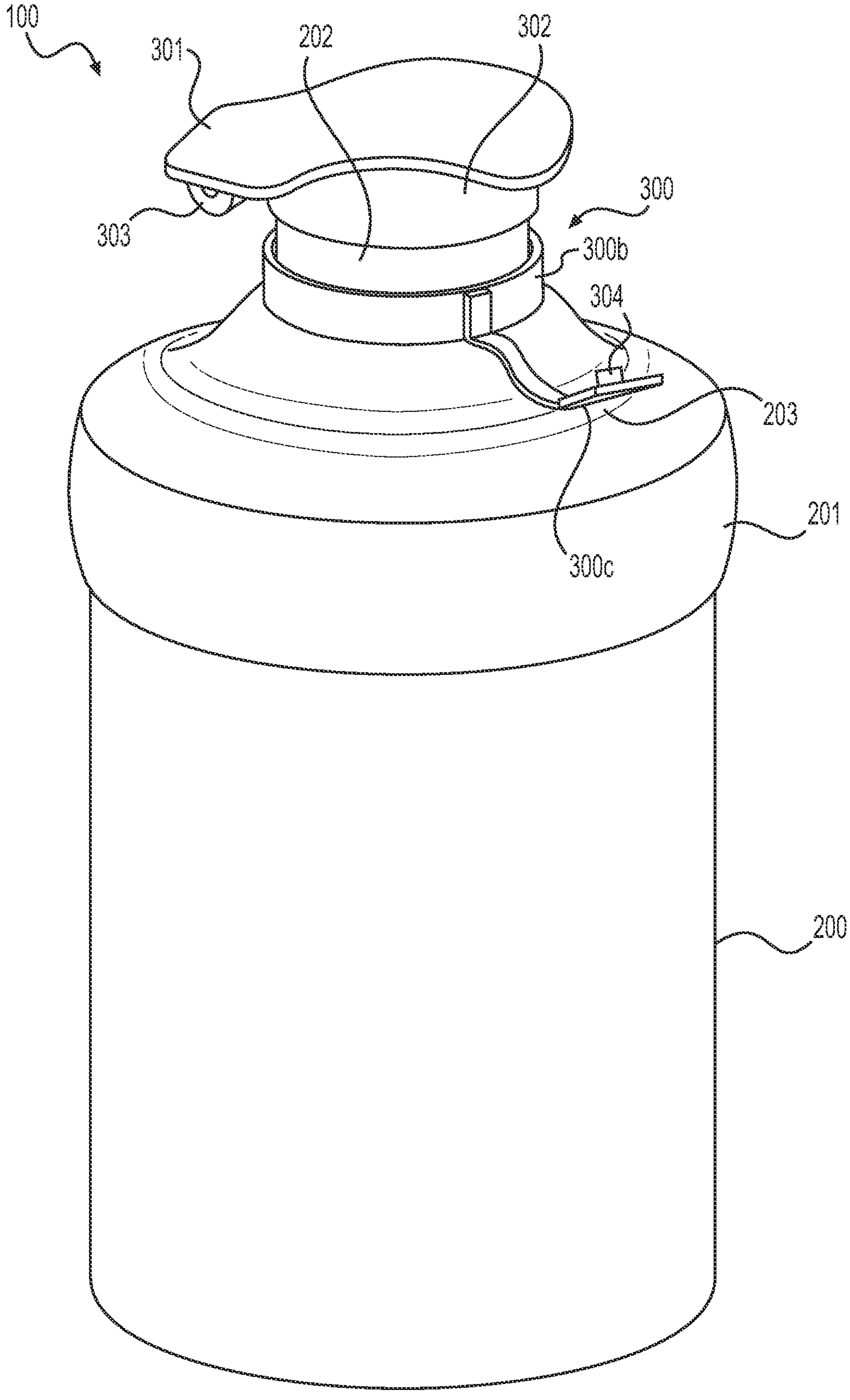
FIG. 5 is a perspective view of the first embodiment of the tamper-proof and controlled dosing container of the present invention with a nozzle plug removed.

FIGS. 1-37 are based upon engineering drawings used for the development and representation of a tamper-proof and controlled dosing container 100 and represents the various embodiments of the present invention. Hence, the drawings are to scale and representative of the geometry and function of the tamper-proof and controlled dosing container 100 comprising a container 200 a functional ring 300 according to the present invention.

Aspects of the present invention are directed to a container 200 including a functional ring 300, the functional ring including a tamper ring portion 300*a*, a dosing ring portion 300*b*, and a nozzle plug 300*c*. The container 200 further includes a pump for dispensing contents via an actuator 302 including a nozzle 301. FIGS. 1-6 illustrate a perspective view of the tamper-proof and controlled dosing container 100 according to an embodiment of the present invention. The container 200 includes a side wall, a top, and a bottom, the top containing an opening allowing access to a cavity defined by the container 200. Contents may be held in the cavity of the container 200. In an embodiment, the side wall may have a curved or cylindrical shape. The actuator 302 is coupled with the container 200 and is depressible in a longitudinal direction. A tube may be provided such that a top end of the tube extends into the actuator 302 and a bottom end of the tube extends into the container 200 to the contents held in the cavity. The tube facilitates the movement of the contents out of the container 200 through the nozzle 301 when the actuator 302 is depressed. The actuator 302 includes the nozzle 301 protruding in a horizontal direction from the actuator 302.

Figure 6:
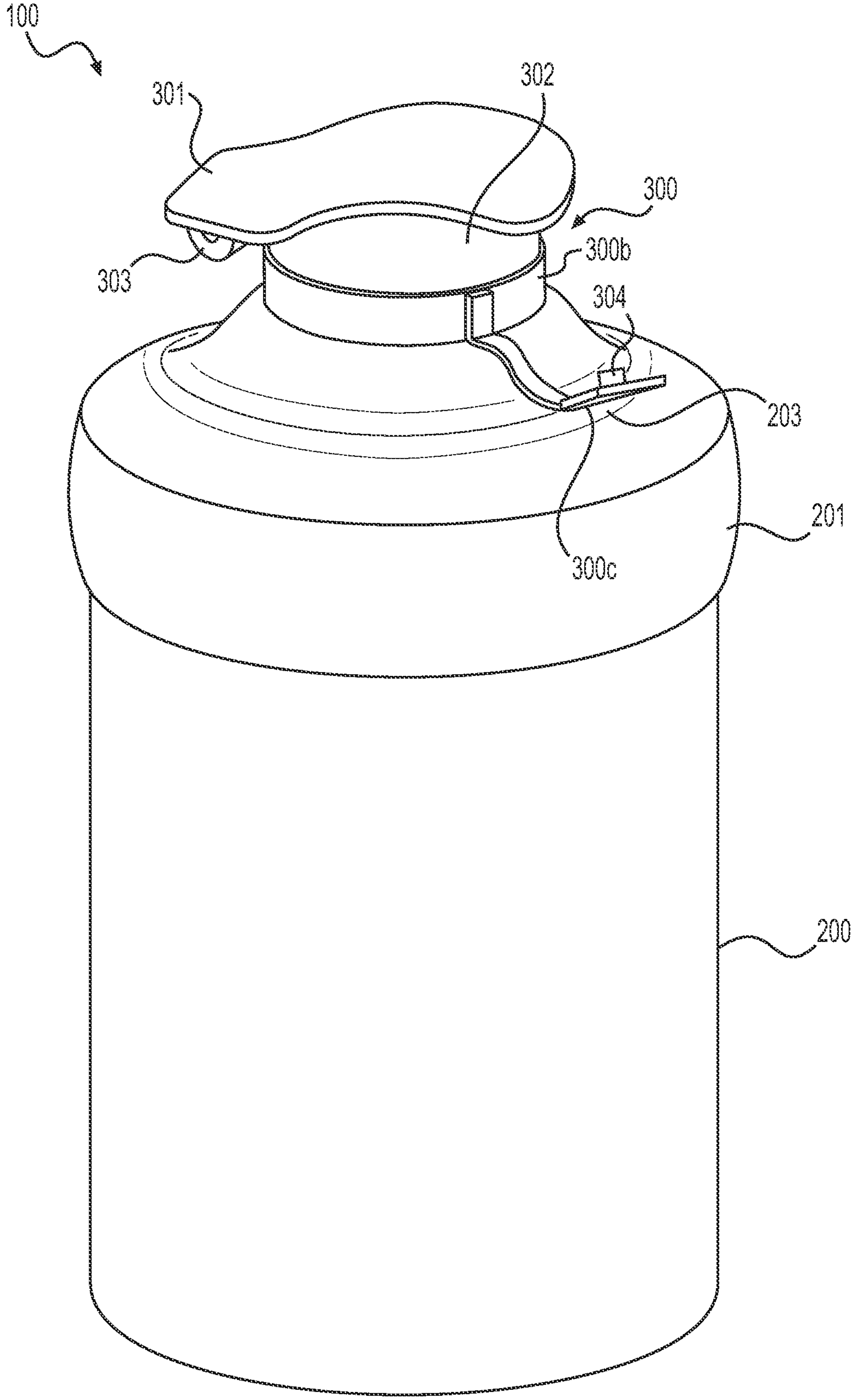
FIG. 6 is a perspective view of the first embodiment of the tamper-proof and controlled dosing container of the present invention being with an actuator being depressed.

FIG. 6 illustrates a perspective view of the tamper-proof and controlling dosing container 100 of the present invention with the actuator being depressed. The actuator 302 may be depressed in a longitudinal direction by a user to engage the internal pump and drive the movement of the contents out of the container 200. The nozzle 301 includes an orifice 303 from which the contents may be dispensed.

The container 200 further includes a cap 201 provided on the top of the container and covering the opening to the cavity. The cap 201 includes a shoulder 203 and a hollow circular neck 202 provided on the shoulder 203. In an embodiment, the container 200 may consist of two separate pieces, wherein the cap 201 may be a separate removeable piece which may be snap fitted or friction fitted to the top of the container 200 to create a permanent and airtight seal. In another embodiment, the cap 201 may be formed integrally with the rest of the container 200 so that the container 200 constitutes a single continuous piece.

The neck 202 is provided below the nozzle 301 and further includes the functional ring 300 provided on an outer surface of the neck 202. In a preferred embodiment, the functional ring 300 includes a tamper ring portion 300*a*, a dosing ring portion 300*b* and a nozzle plug 300*c*. A user is required to remove the tamper ring portion 300*a* before accessing the contents held in the container 200 for the first time; thus, the tamper ring portion 300*a* is provided so as to be removable. The functional ring 300 may be attached to the neck 202 in any suitable manner know in the art. In a preferred embodiment, the functional ring 300 is snap fitted on to the neck.

The functional ring 300 may completely occupy the space or length of the neck 202 so that the actuator 302 cannot be depressed or moved in the longitudinal direction to engage the pump within the container 200 while the tamper ring portion 300*a* of the functional ring 300 is in place. The space or length of the neck is the distance between the bottom of the actuator 302 to the top of the shoulder 203. Thus, a user must remove or break the tamper ring portion 300*a* prior to using the container 200 to dispense the contents. The tamper ring portion 300*a* prevents tampering of the contents prior to the user using the container 200 for the first time by blocking access to the contents held in the container 200. Additionally, if there has been any prior access to the contents or tampering of the contents, the tamper ring portion 300*a* would necessarily be removed or broken, thus, a subsequent user would have clear indication of tampering.

Once the tamper ring portion 300*a* has been removed by a user, the dosing ring portion 300*b* remains on the neck 202. The dosing ring portion 300*b* of the functional ring 300 controls the distance the actuator 302 moves when depressed by a user, thereby controlling the amount of contents that is dispensed from the container 200. When the actuator 302 is depressed by a user, the bottom of the actuator 302 abuts the top surface of the dosing ring portion 300*b*. The contact of the actuator 302 with the dosing ring portion 300*b* creates a mechanical stop preventing the actuator 302 from being depressed further, thereby controlling the distance the actuator 302 moves and controlling the amount of contents that is dispensed from the nozzle 301. The dosing ring portion 300*b* preferably remains on the neck 202 of the container 200 so that the dosing of the container 200 is consistent for the life of the container 200. Dosing ring portions 300*b* with different heights may be used in combination with the same standard container 200 and the same actuator 302 and pump make it possible to obtain containers 200 dispensing different preset amounts in an efficient way while minimizing cost and complexity in manufacturing.

In an embodiment, the dosing ring portion 300*b* may occupy about ¼ of the total space or length of the neck 202. In another embodiment, the dosing ring portion 300*b* may occupy about ½ the total space or length of the neck 202. In another embodiment, the dosing ring portion 300*b* may occupy about ¾ of the total space or length of the neck 202. In a preferred embodiment, the dosing ring portion 300*b* occupies about ½ of the total space or length of the neck 202 thereby, limiting the vertical movement of the actuator 202 by about half to dispense about half of a predetermined dose. In a preferred embodiment, the dosing ring portion 300*b* modifies the container 200 from dispensing about 4 grams per actuation to dispensing about 2 grams per actuation by limiting the vertical movement of the actuator 302 along the neck 202 by about half.

In an embodiment, the dosing ring portion 300*b* may be provided below the tamper ring portion 300*a*, thereby, a bottom surface of the tamper ring portion 300*a* may be provided on a top surface of the dosing ring portion 300*b*. Since the tamper ring portion 300*a* must be removed prior to accessing the contents of the container 200 for the first time, the tamper ring portion 300*a* is attached to the dosing ring portion 300*b* so as to be removeable. The dosing ring portion 300*b* remains on the container 200 to modify the dose dispensed from the container by limiting the vertical movement of the actuator. Once the tamper ring portion 300*a* is removed, the dosing ring portion 300*b* remains on the neck and controls the distance the actuator 302 moves when depressed by a user. In another embodiment, the bottom surface of the nozzle 301 may abut the top surface of the dosing ring portion 300*b* in order to limit the vertical movement of the actuator 302.

The present invention further includes a nozzle plug 300*c* provided on the functional ring 300. The nozzle plug 300*c* may extend from the dosing ring portion 300*b* to the orifice 303 of the nozzle and plug the orifice 303 to prevent leaking and/or contamination of the contains held in the container 200. The nozzle plug 300*c* may include a band which includes a substantially square head portion at one end and is connected to the dosing ring portion 300*b* at an opposite end. In another embodiment, the head portion may be a substantially rectangular shape. Further, the head portion of the nozzle plug is not limited and may be any suitable shape or size.

The head portion of the nozzle plug 300*c* includes a protrusion 304 on an inner surface at one end. The protrusion protrudes in a substantially perpendicular direction from the head portion and fits into the orifice 303 to plug the opening. In an embodiment, the nozzle plug 300*c* is permanently attached at one end to the functional ring and is removeable inserted into the orifice 303 of the nozzle 301 at an opposite end; therefore, when the user is dispensing contents from the container, the nozzle plug 300*c* may be removed from the orifice 304 of the nozzle 301 so that the contents may flow from the orifice 304.

Figure 7:
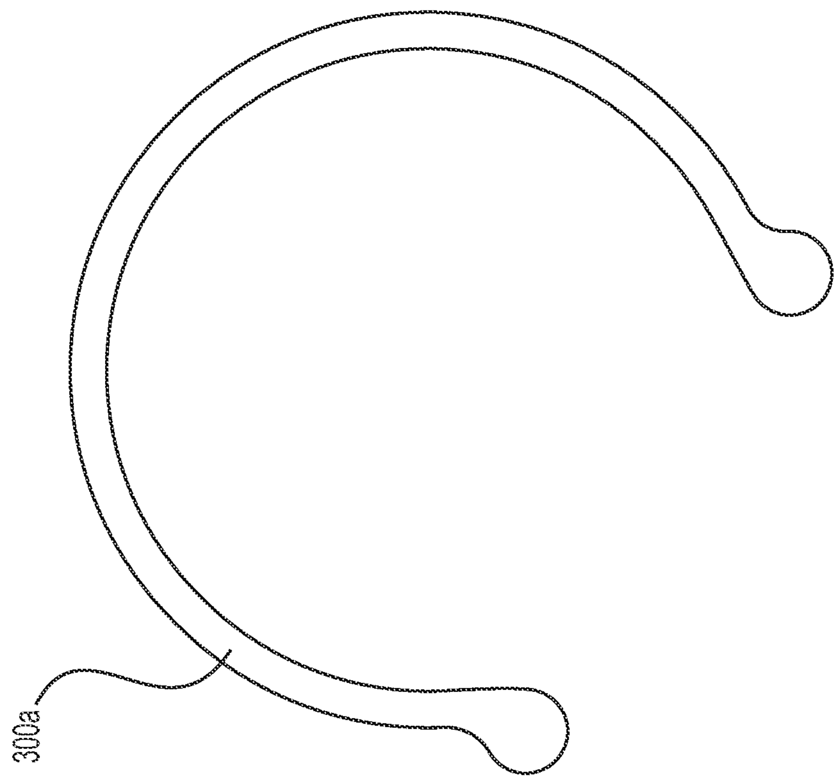
FIG. 7 is a top view of tamper ring portion according to the first embodiment of the present invention.
Figure 8:
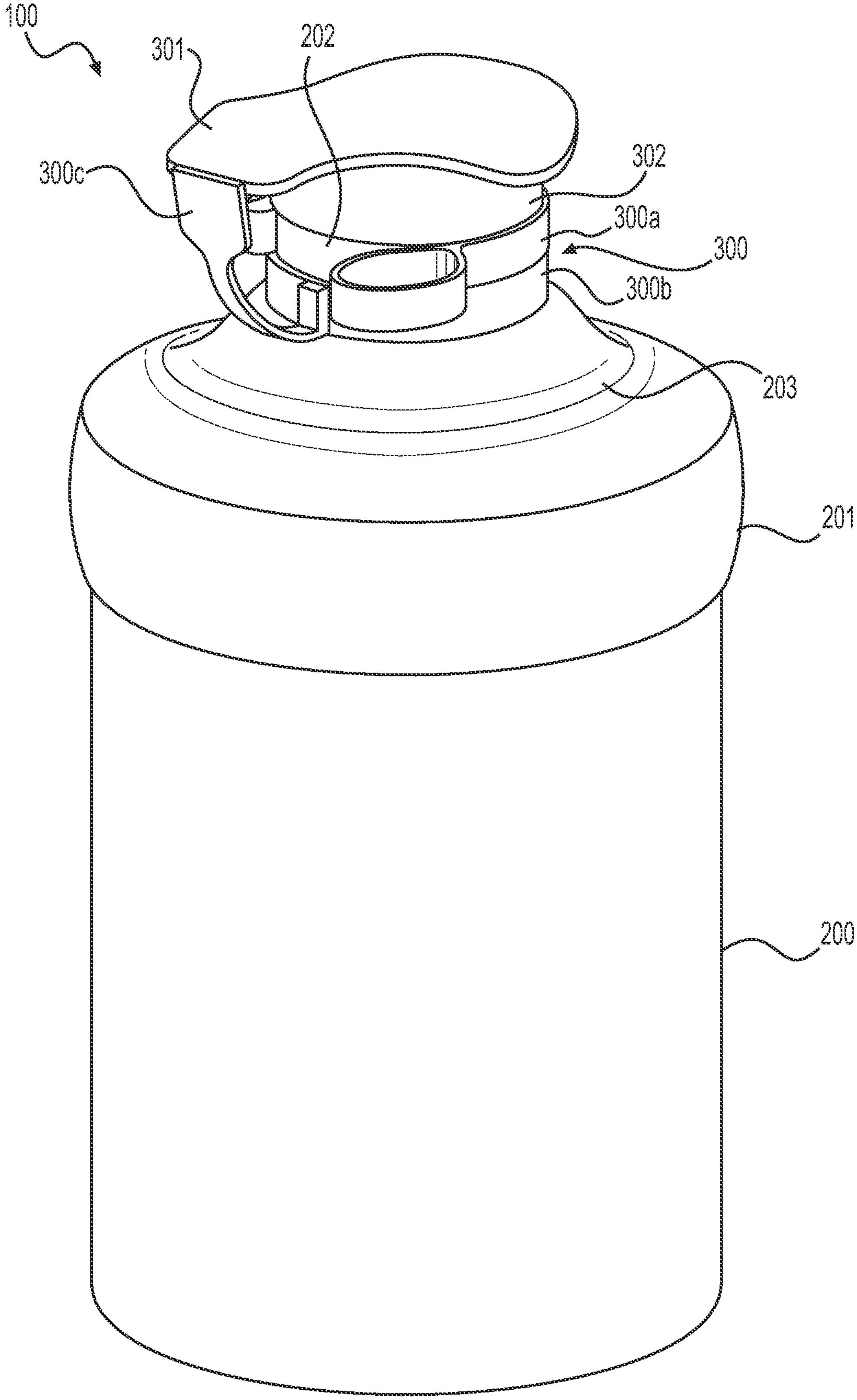
FIG. 8 is a perspective view of a second embodiment of the tamper-proof and controlled dosing container of the present invention.
Figure 9:
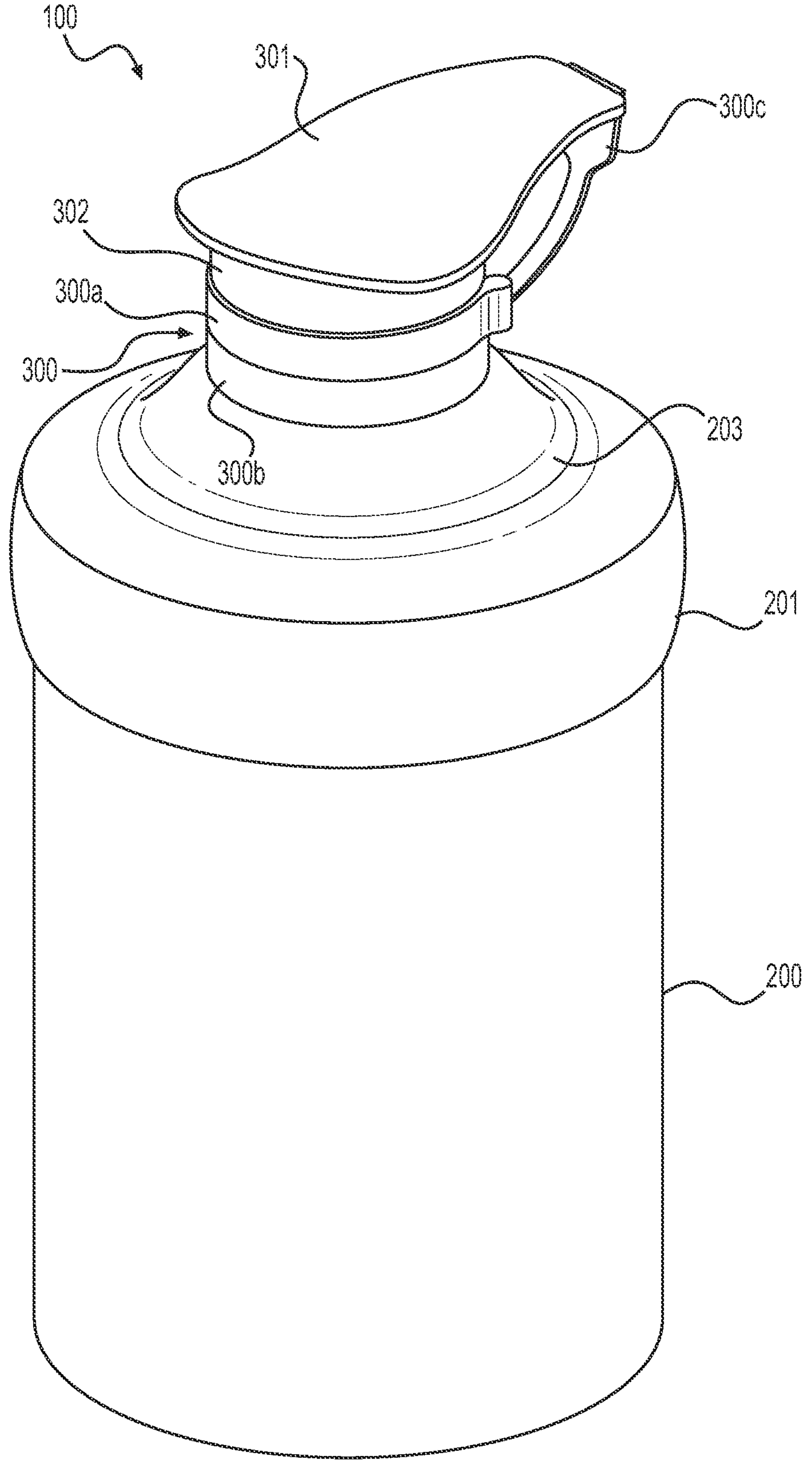
FIG. 9 is a back view of the second embodiment of the tamper-proof and controlled dosing container of the present invention.
Figure 10:
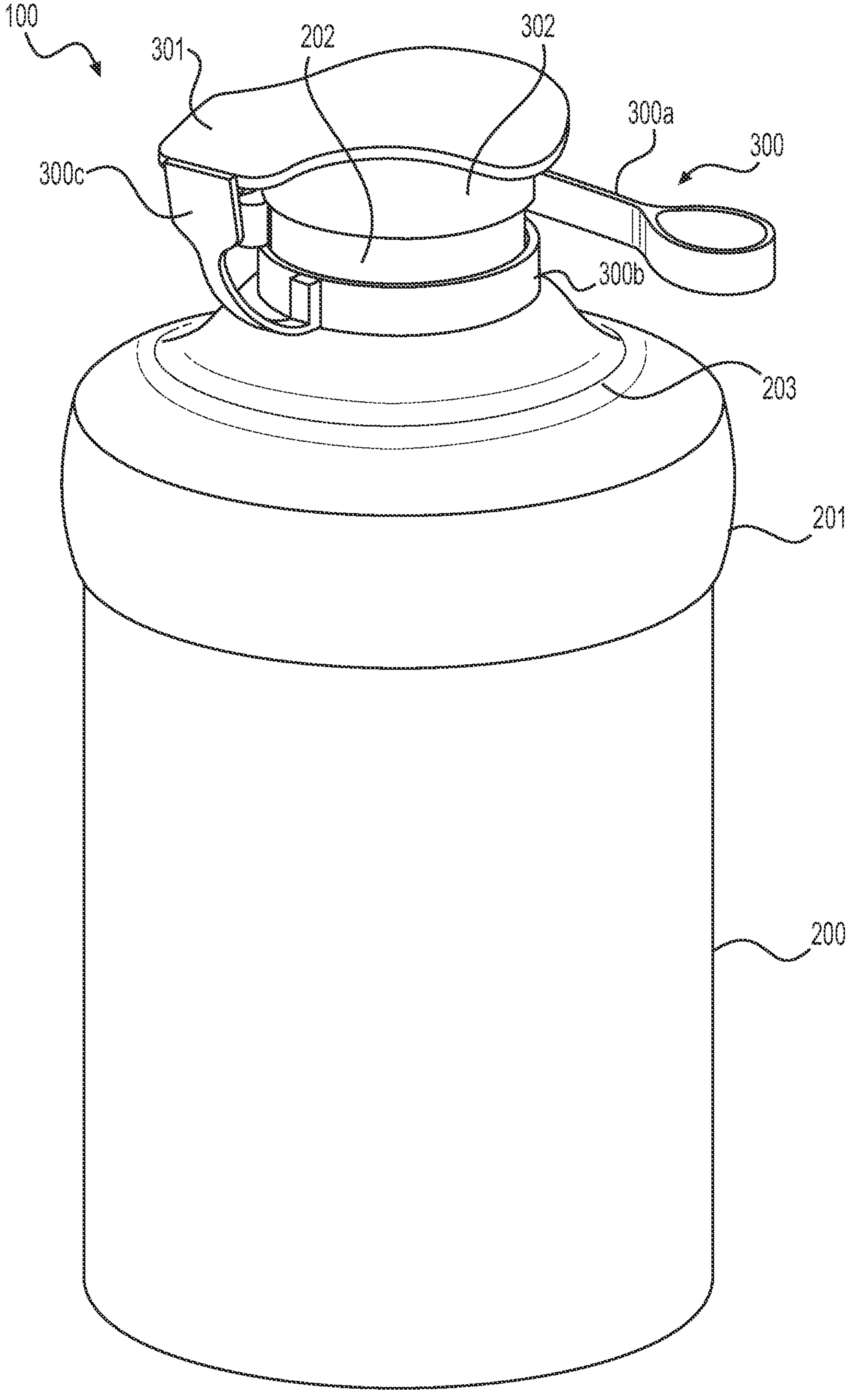
FIG. 10 is a perspective view of the second embodiment of the tamper-proof and controlled dosing container of the present invention with the tamper ring portion being removed.
Figure 11:
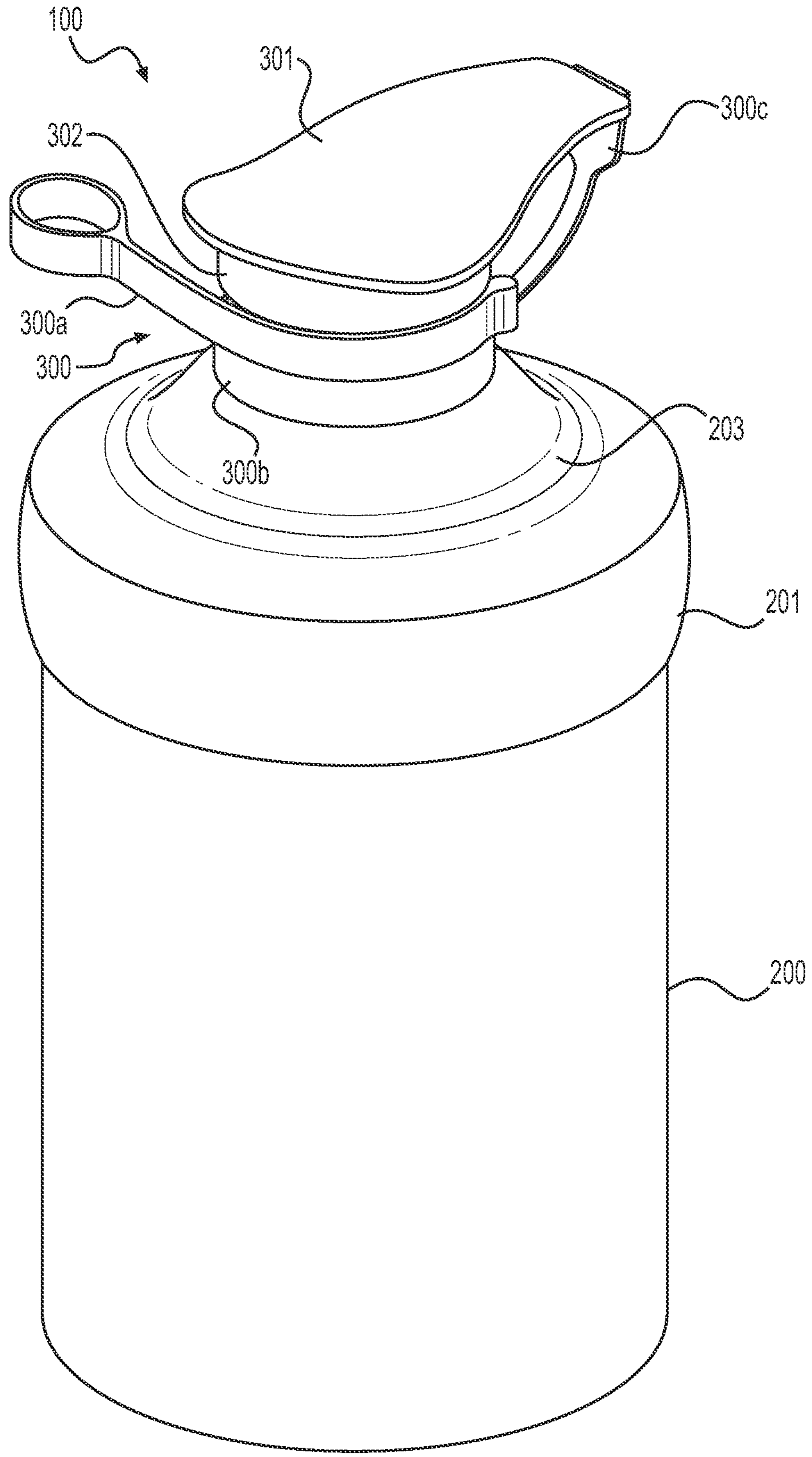
FIG. 11 is a back view of the second embodiment of the tamper-proof and controlled dosing container of the present invention with the tamper ring portion being removed.
Figure 12:
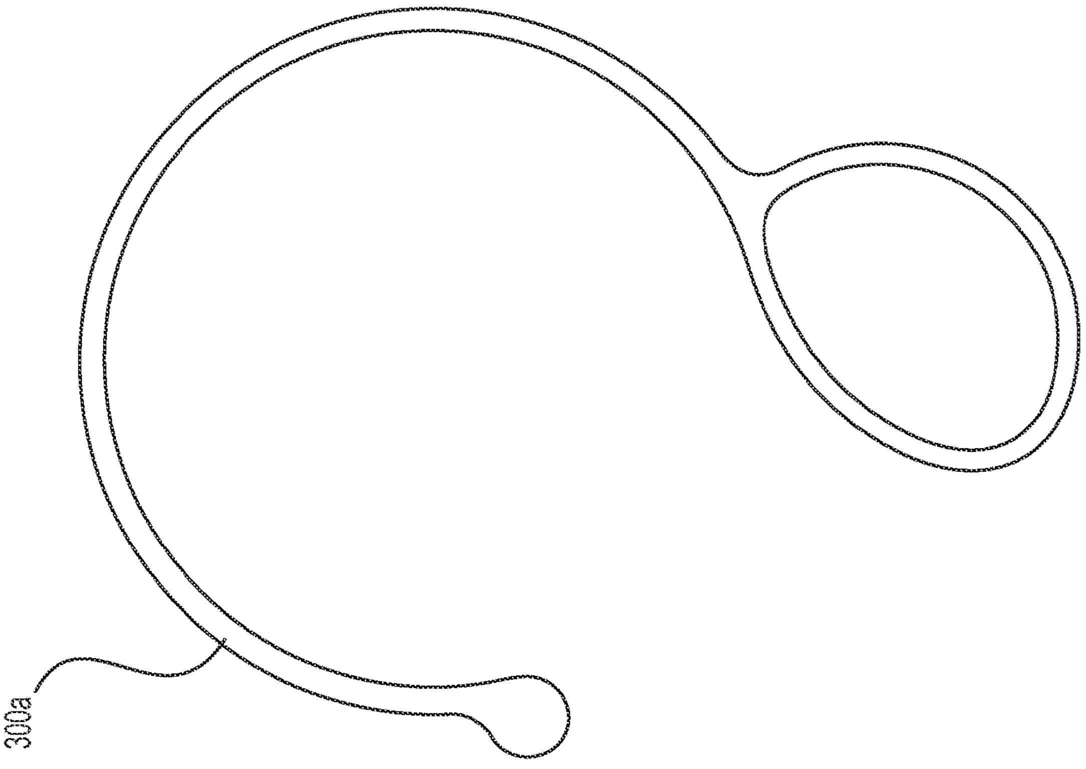
FIG. 12 is a top view of the tamper ring portion according to the second embodiment of the present invention.
Figure 13:
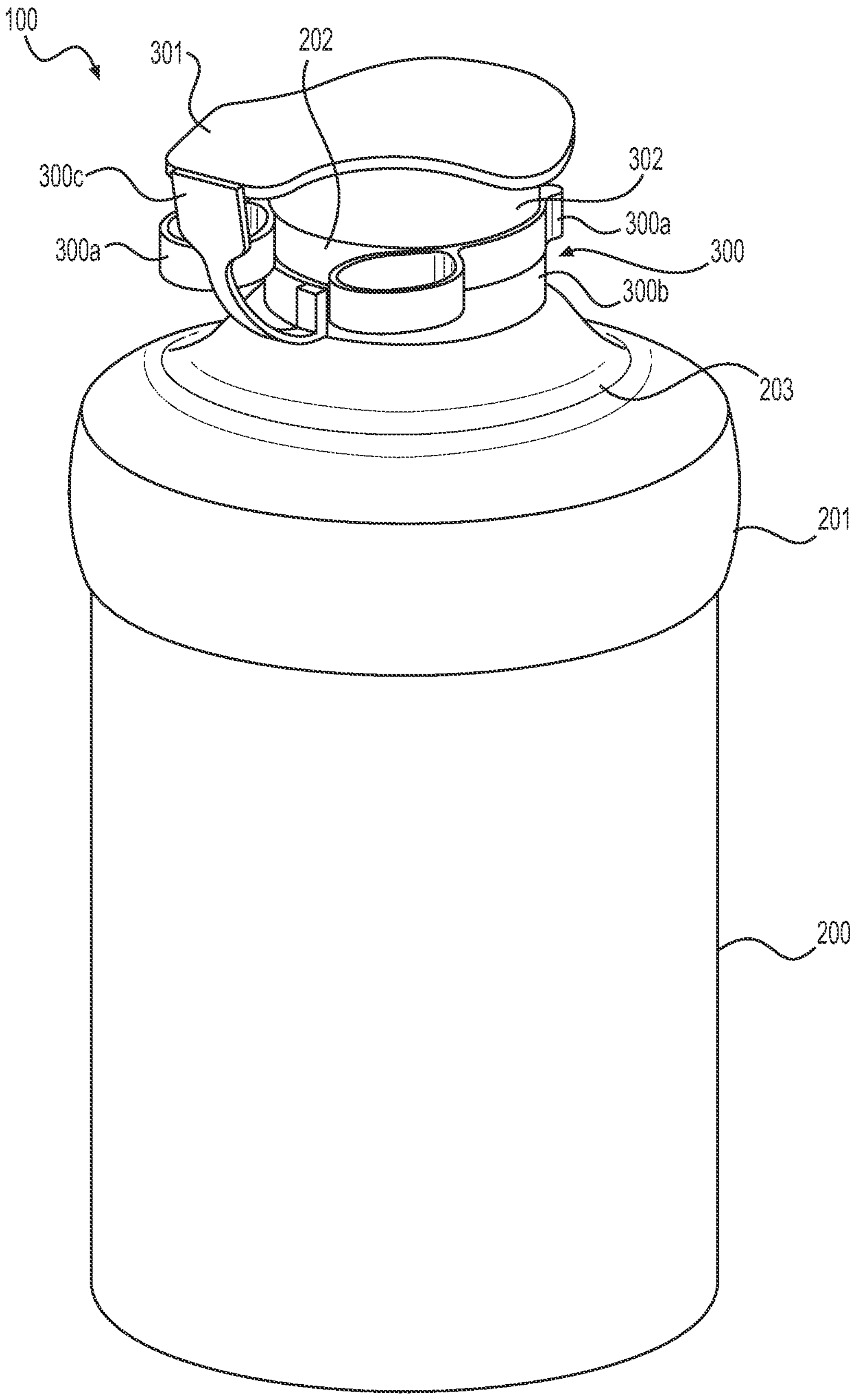
FIG. 13 is a perspective view of a third embodiment of the tamper-proof and controlled dosing container of the present invention.
Figure 14:
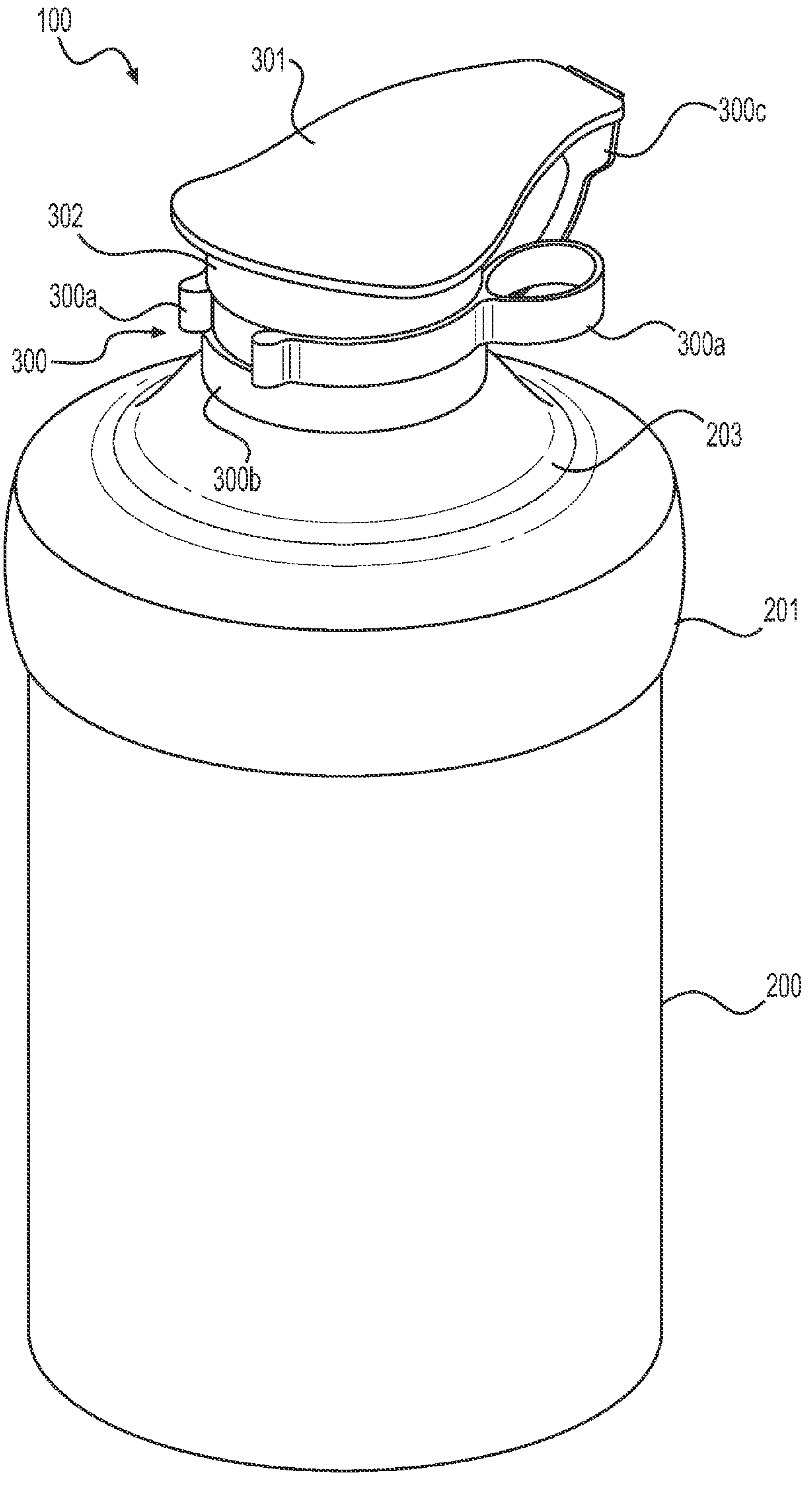
FIG. 14 is a back view of the third embodiment of the tamper-proof and controlled dosing container of the present invention.
Figure 15:
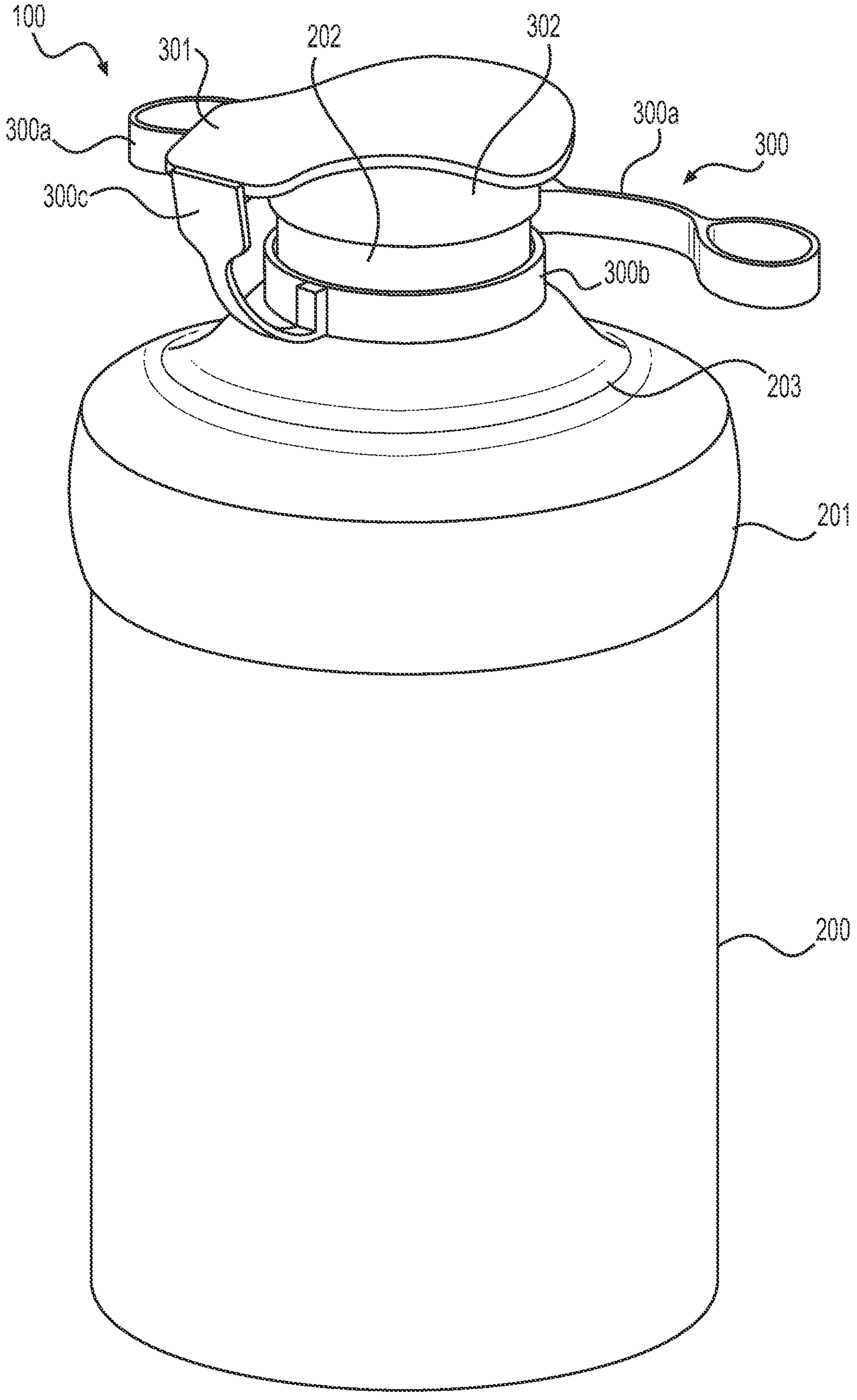
FIG. 15 is a perspective view of the third embodiment of the tamper-proof and controlled dosing container of the present invention with the tamper ring portion being removed.
Figure 16:
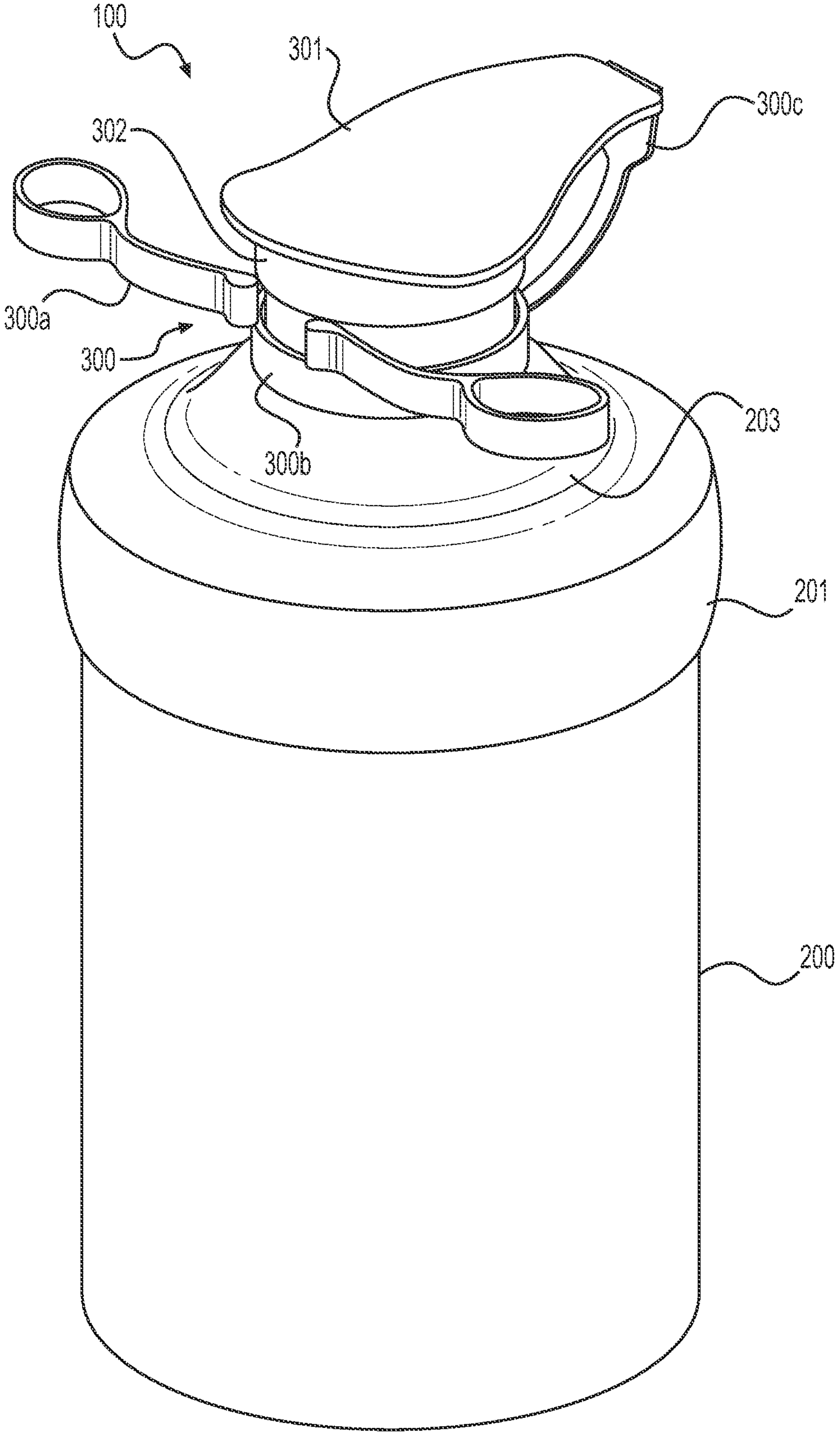
FIG. 16 is a back view of the third embodiment of the tamper-proof and controlled dosing container of the present invention with the tamper ring portion being removed.
Figure 17:
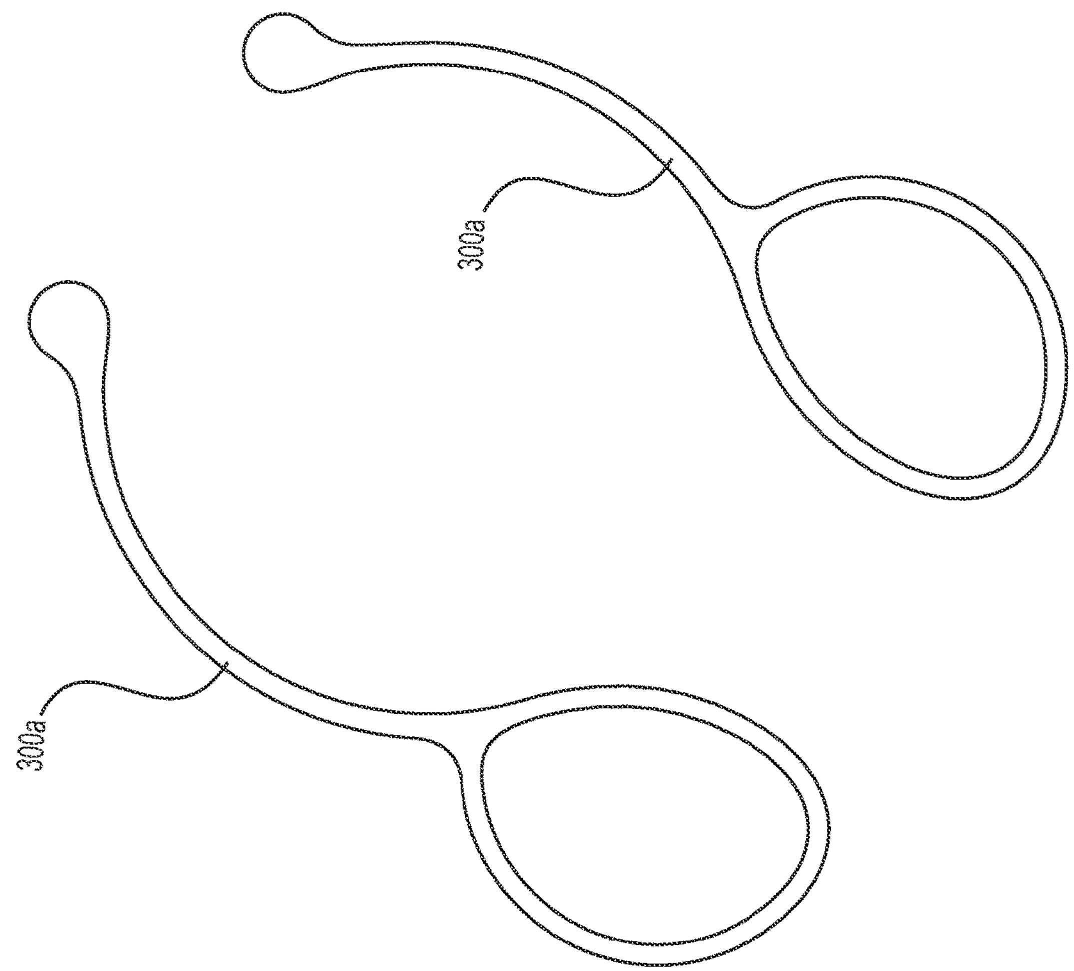
FIG. 17 is a top view of the tamper ring portion according to the third embodiment of the present invention.

FIG. 7 illustrates a top view of the tamper ring portion according to an embodiment of the present invention. In an embodiment, the tamper ring portion 300*a* of the functional ring 300 may be a substantially circular ring that may be removed by a user from either end in a pulling motion. In a preferred embodiment, the tamper ring portion 300*a* is not a complete ring and a gap exists between the two ends of the tamper ring portion 300*b* when it is around the neck 202. The tamper ring portion 300*a* further may include a gripping portion at each end which allows for easily gripping and tearing off the tamper ring portion 300*a* by the user.

FIG. 8-12 illustrate a tamper-proof and controlled dosing container 100 according to a second embodiment of the present invention. In this embodiment, the tamper ring portion 300*a* includes a loop provide at either end or at both ends of the tamper ring portion 300*b*. The user may insert their finger into the loop or grip the loop to easily pull the tamper ring portion 300*b* off in a swift motion. This embodiment may be particularly useful for senior adults with dexterity issues.

FIG. 13-17 illustrate a tamper-proof and controlled dosing container 100 according to a third embodiment of the present invention. In this embodiment, the tamper ring portion 300*a* comprises two separate pieces that are provided on the neck 202 of the container 200, one end of each of the pieces having a loop. The two pieces of the tamper ring portion 300*a* may be attached around the neck so a to form a complete circle or may be attached around the neck so as to have a gap at either end. Both of the pieces of the tamper ring portion 300*a* must be removed by the user in order to allow the actuator to be depressed.

Figure 18:
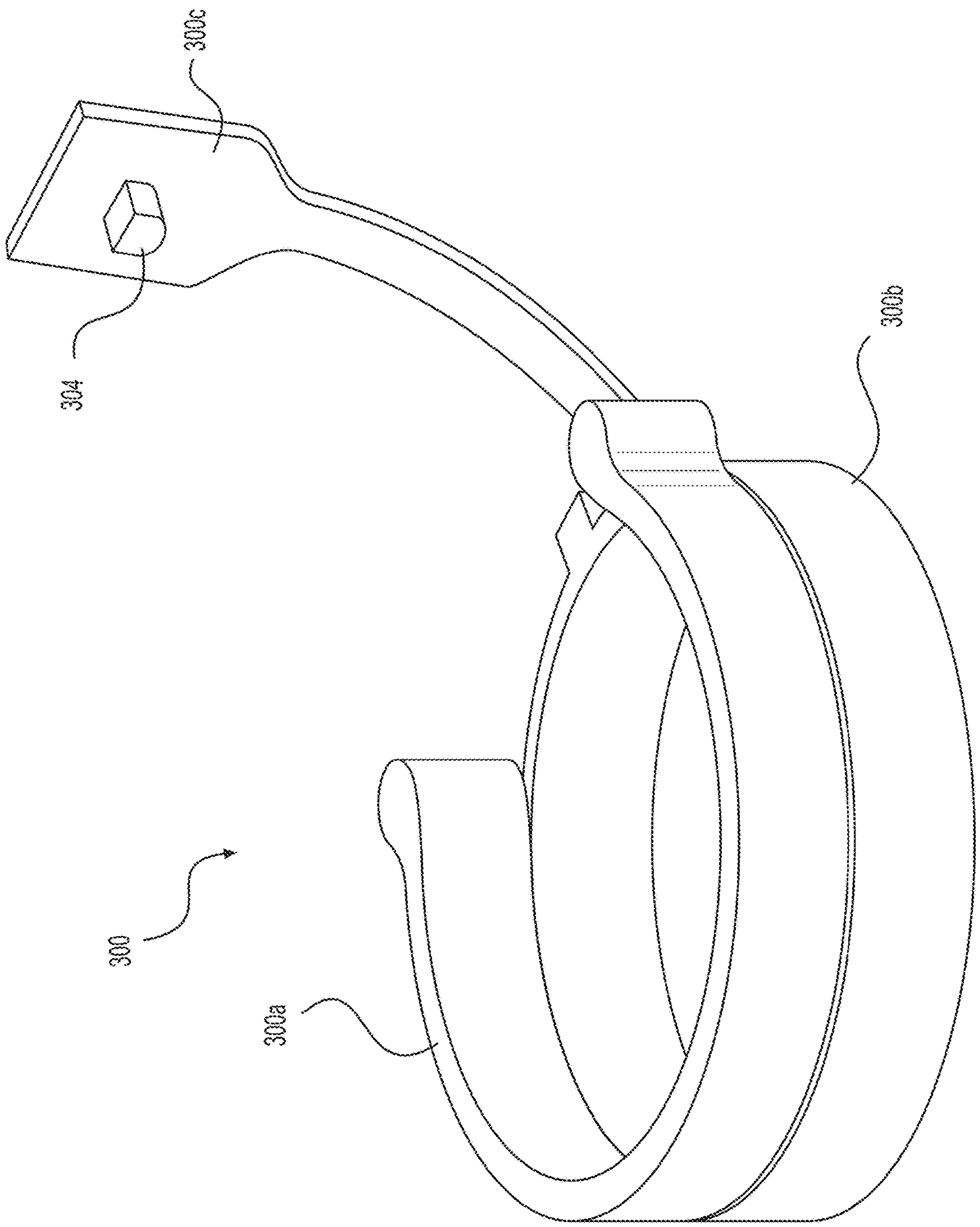
FIG. 18 is a perspective view of a functional ring according to the first embodiment of the present invention.
Figure 19:
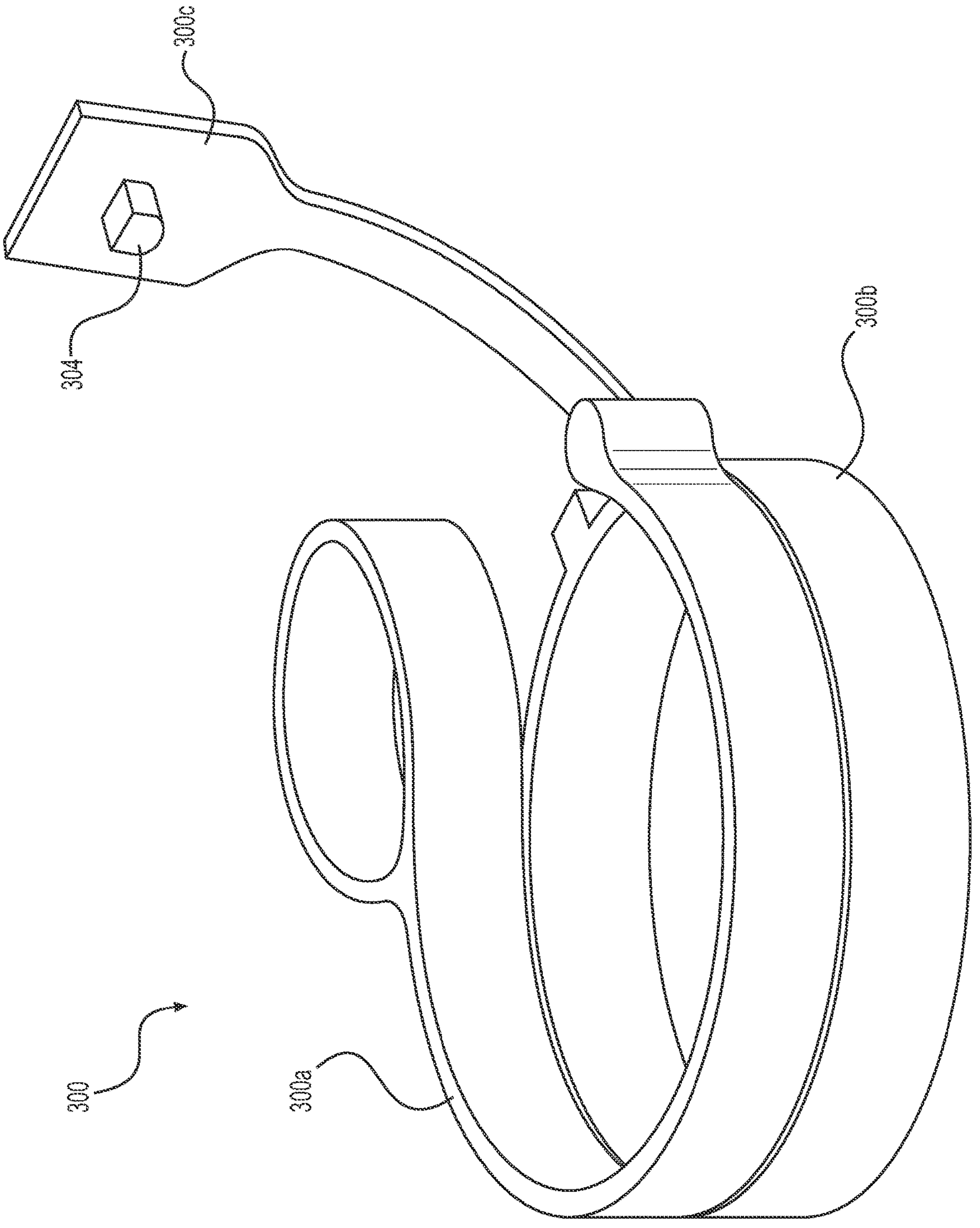
FIG. 19 is a perspective view of the functional ring according to the second embodiment of the present invention.
Figure 20:
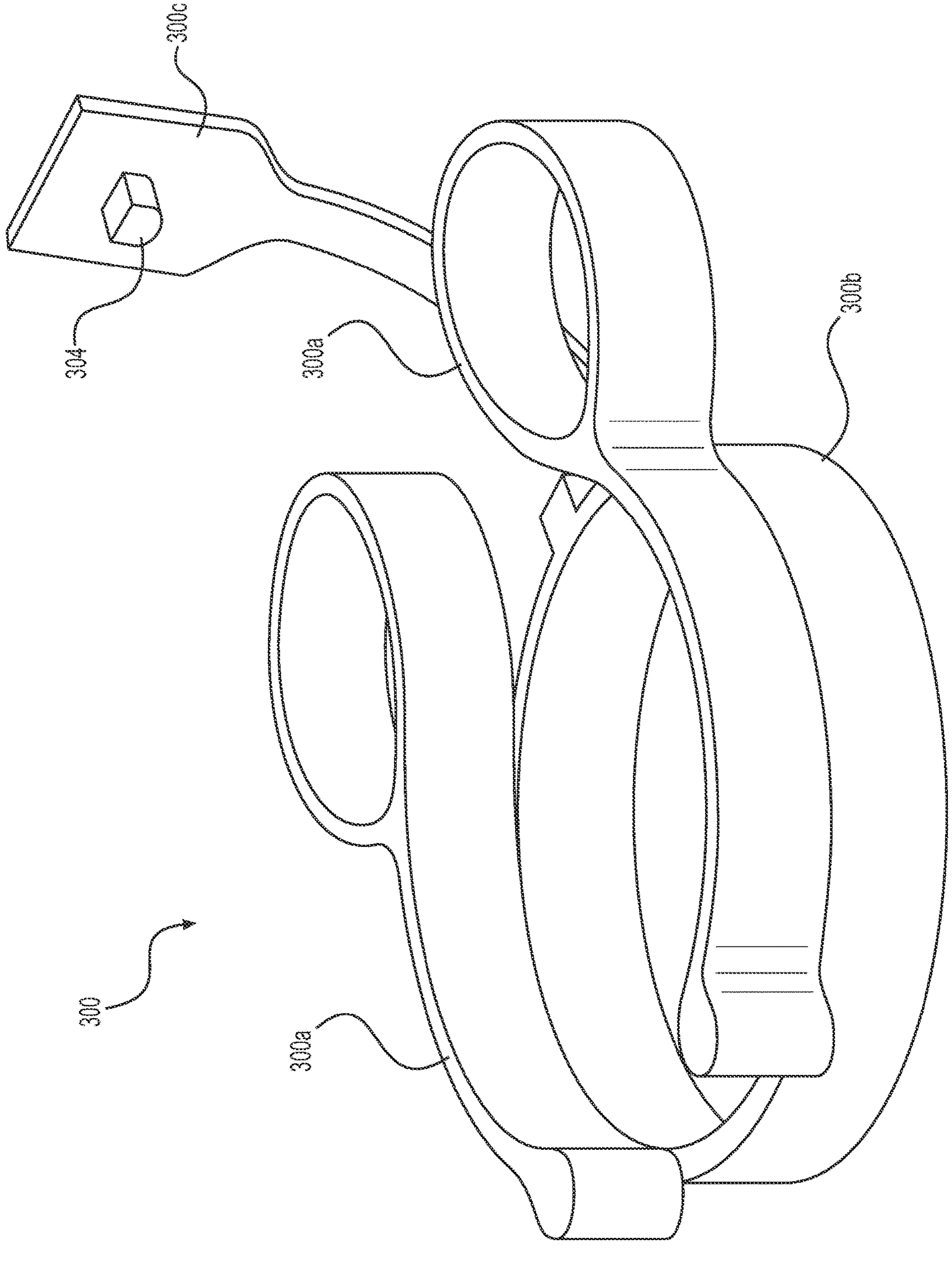
FIG. 20 is a perspective view of the functional ring according to the third embodiment of the present invention.

FIGS. 18-20 illustrate a functional ring 300 according to the present invention separated from the container 200. The functional ring 300 includes the tamper ring portion 300*a*, the dosing ring portion 300*b* and the nozzle plug 300*c*. The tamper ring portion 300*a*, the dosing ring portion 300*b*, and the nozzle plug 300*c* may operate as a connected system, with each part being connected together.

Figure 21:
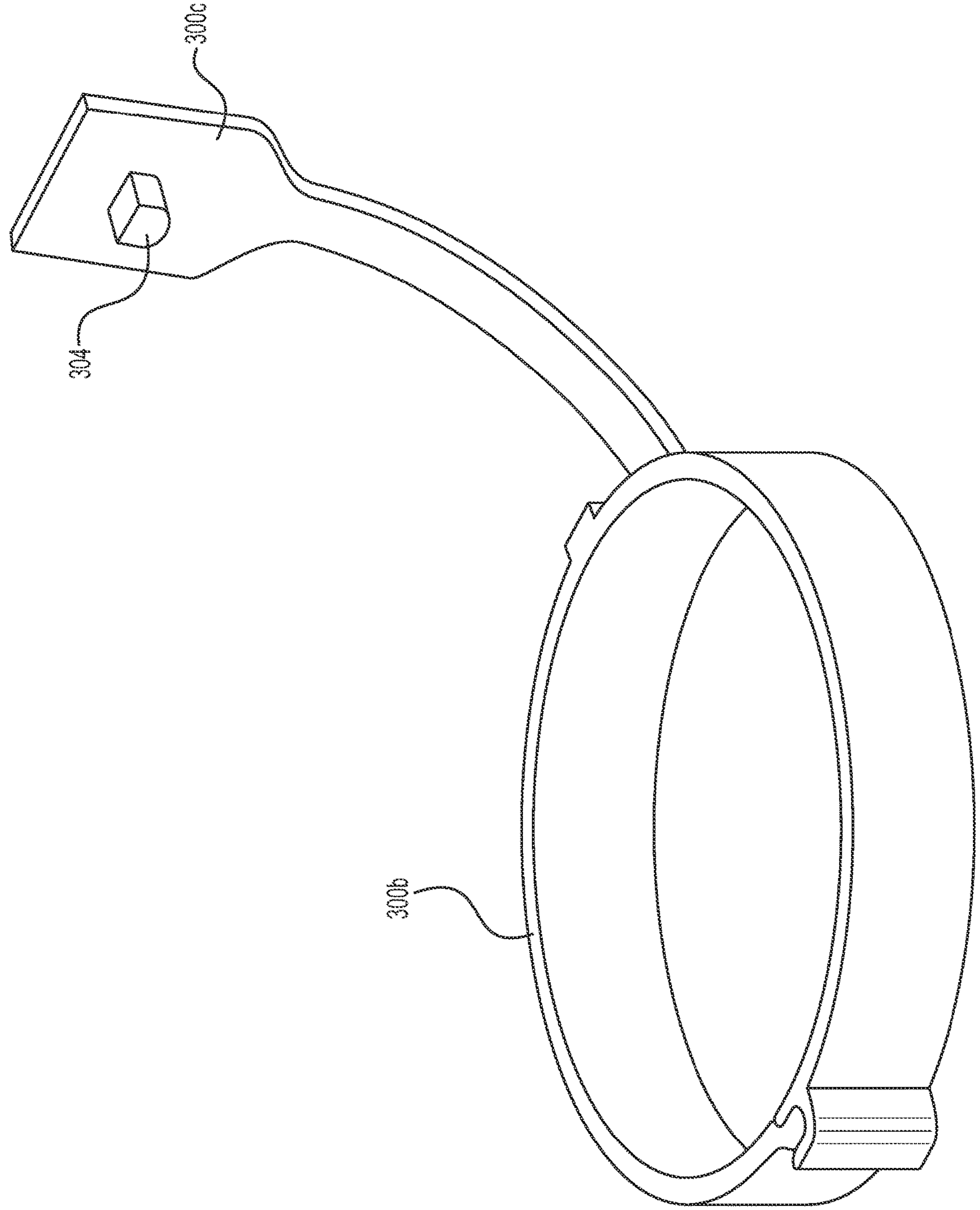
FIG. 21 is a perspective view of a dosing ring portion according to the present invention.
Figure 22:
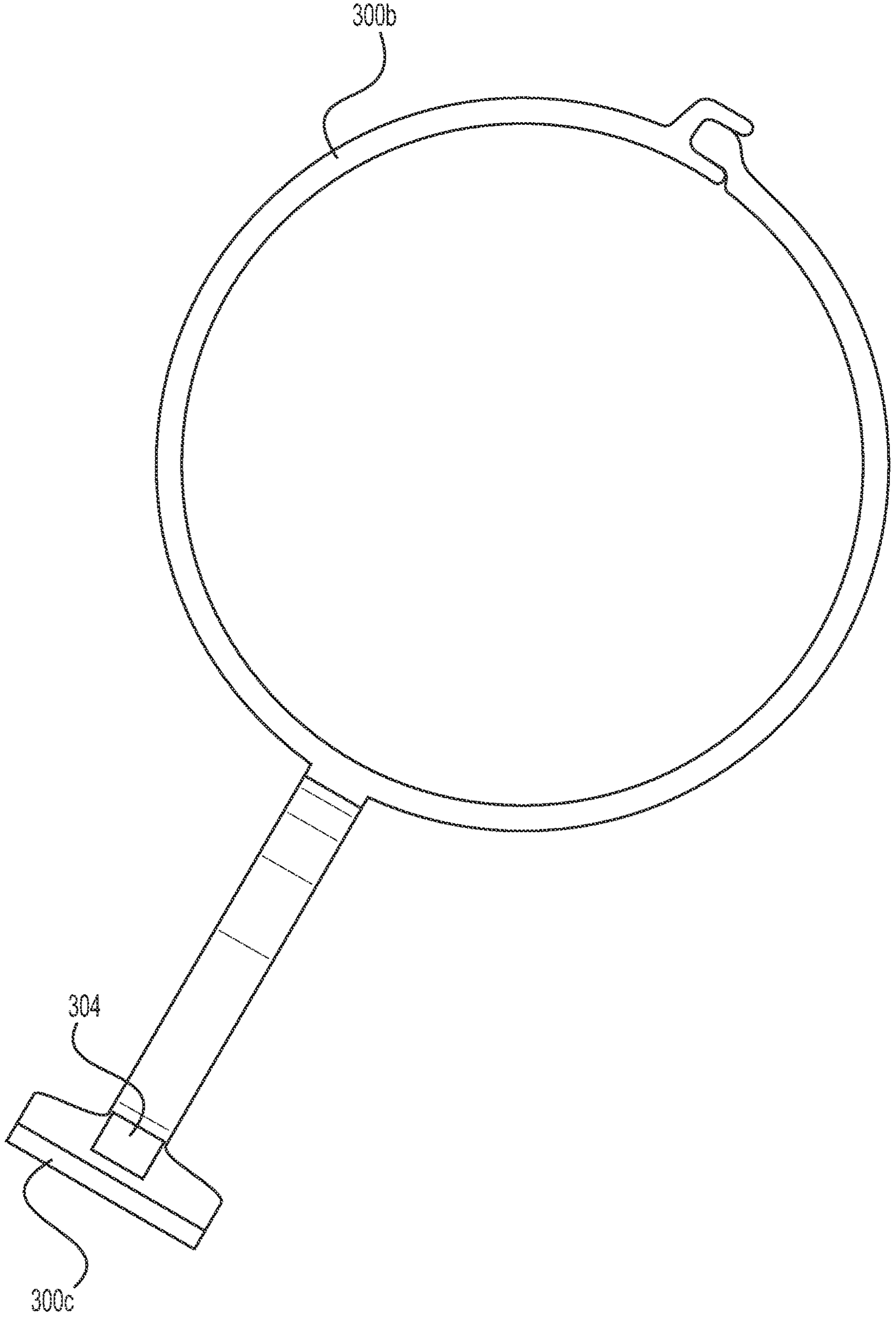
FIG. 22 is a top view of the dosing ring portion according to the present invention.
Figure 23:
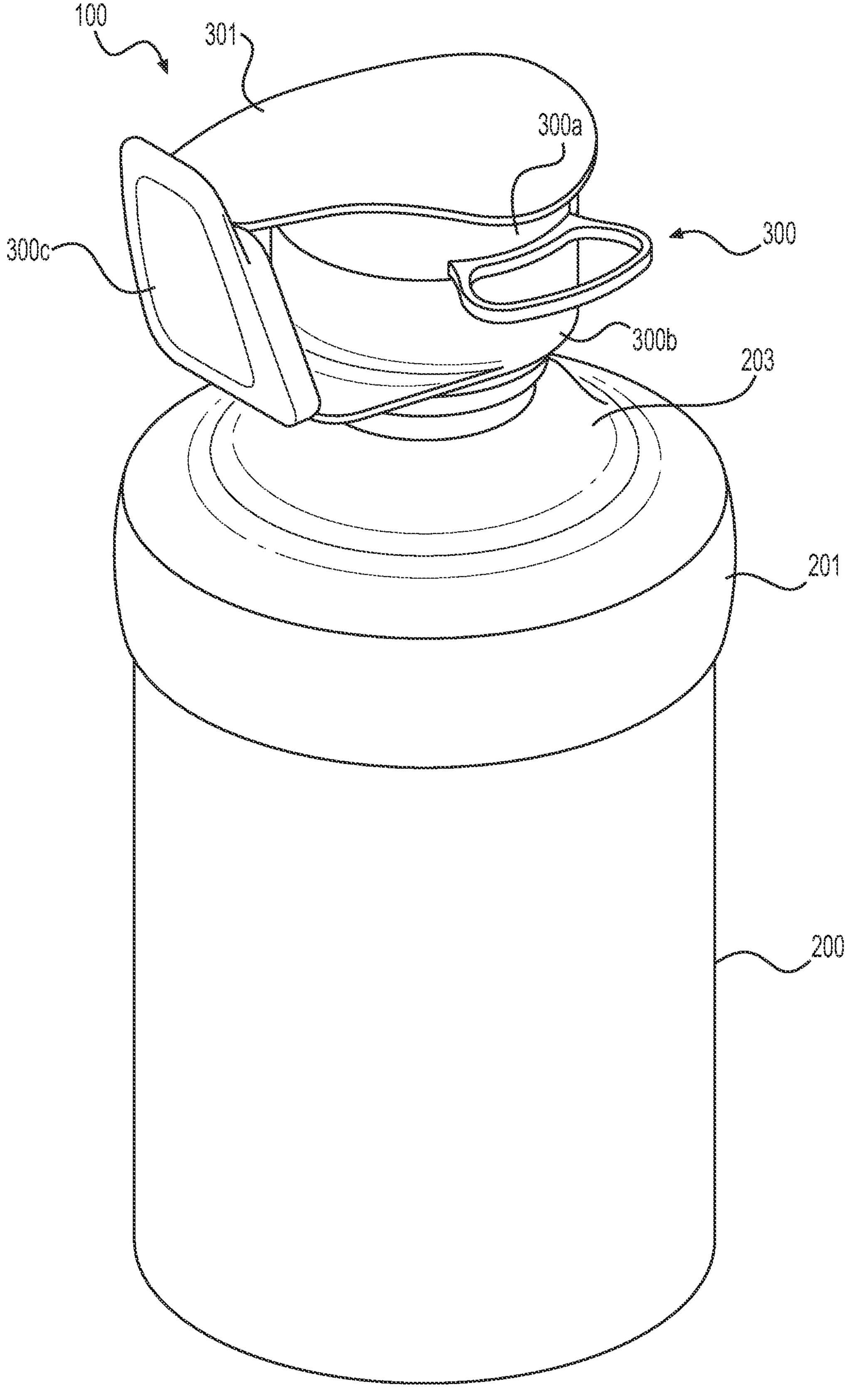
FIG. 23 is a perspective view of a fourth embodiment of the tamper-proof and controlled dosing container according to the present invention.
Figure 24:
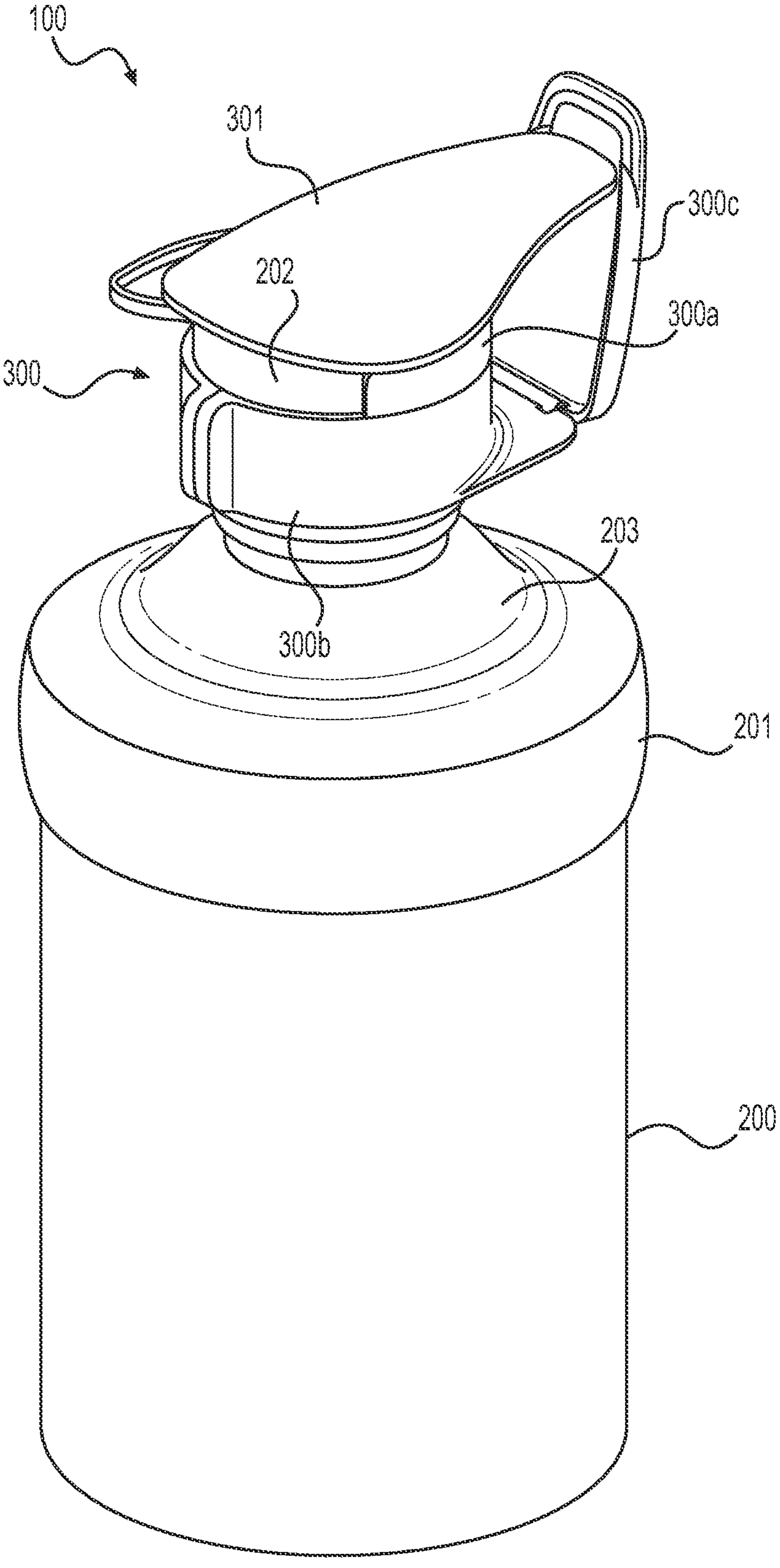
FIG. 24 is a back view of the fourth embodiment of the tamper-proof and controlled dosing container according to the present invention.
Figure 25:
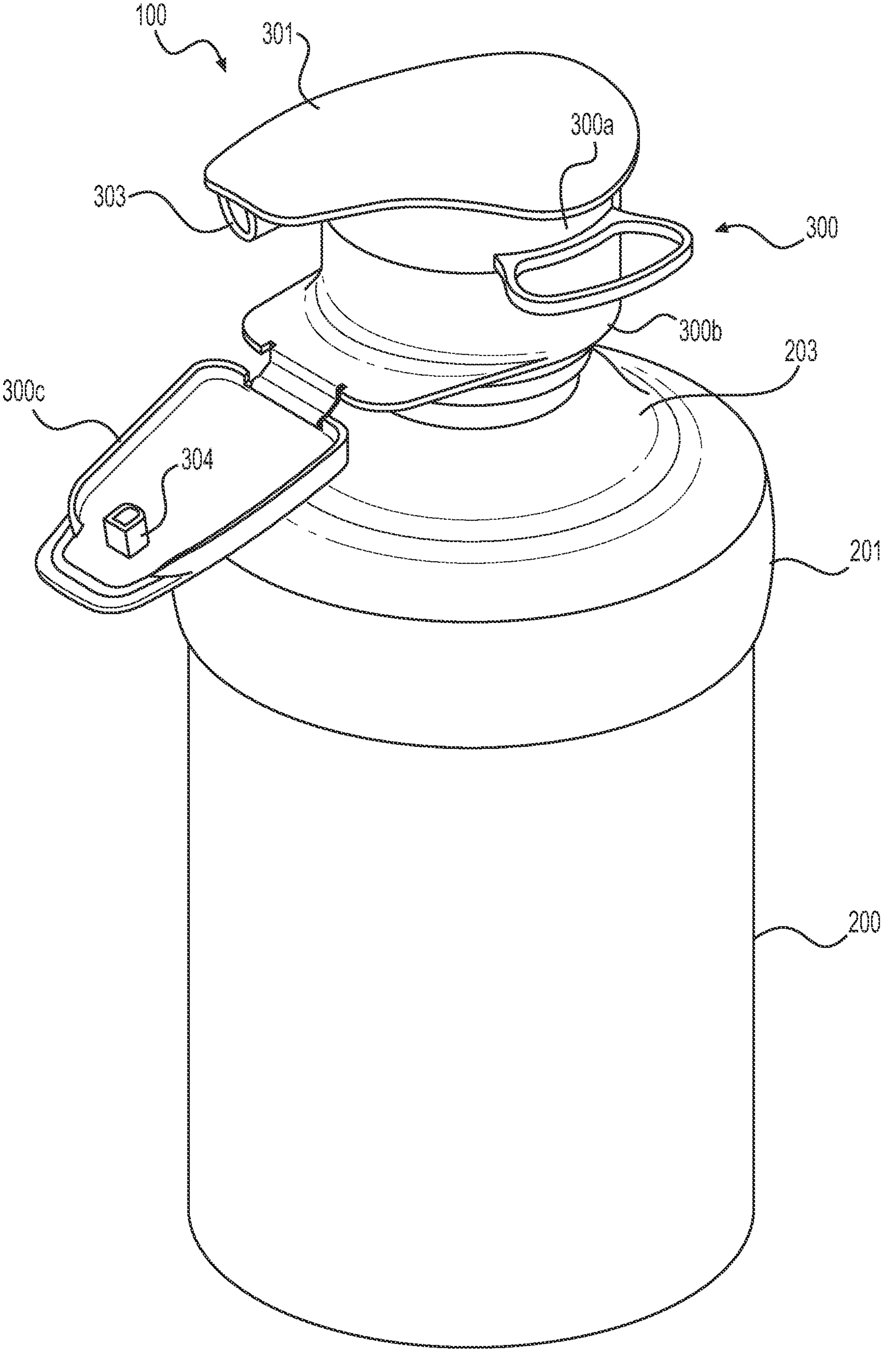
FIG. 25 is a perspective view of the fourth embodiment of the tamper-proof and controlled dosing container according to the present invention with the nozzle plug removed.
Figure 26:
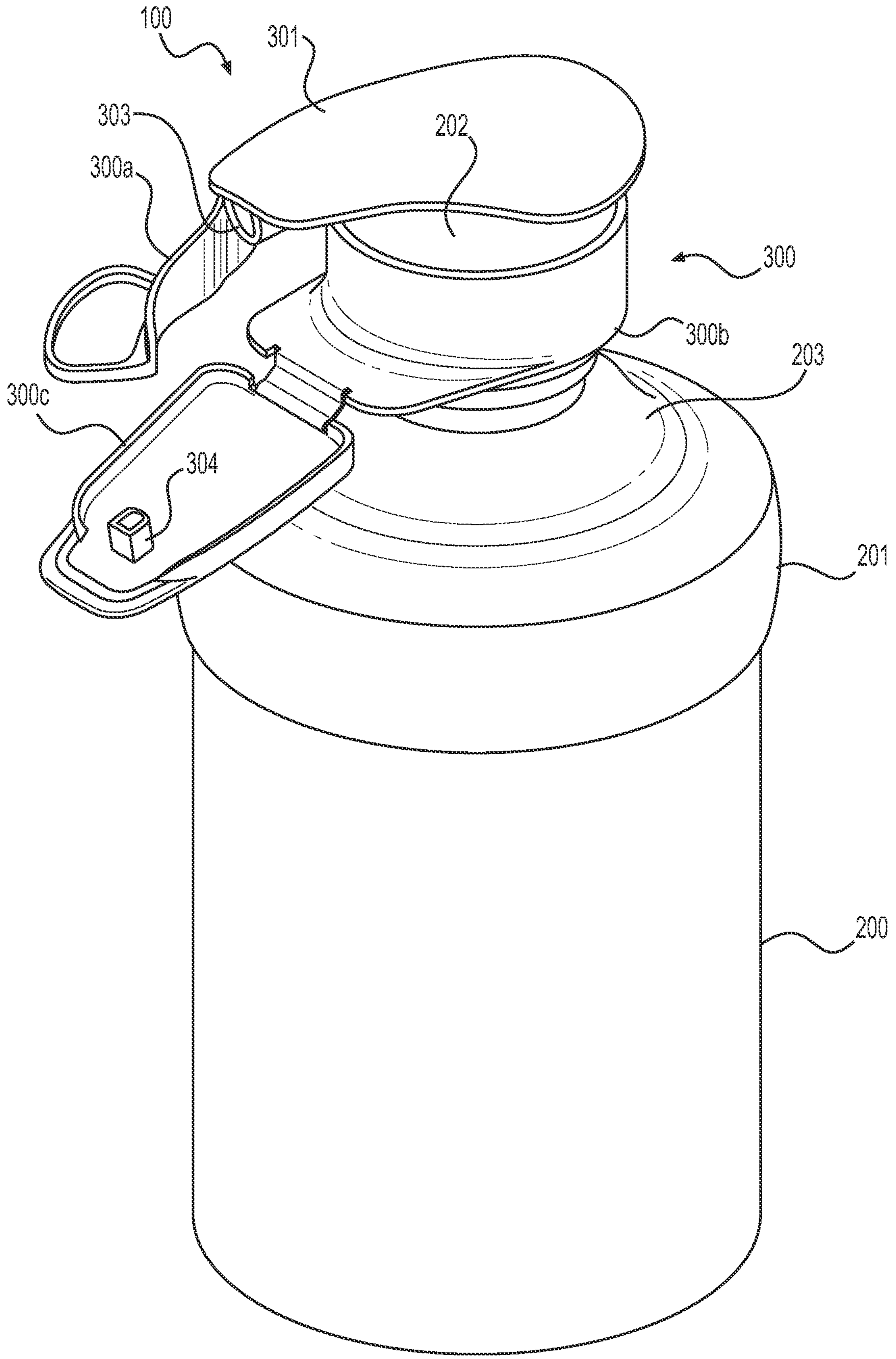
FIG. 26 is perspective view of the fourth embodiment of the tamper-proof and controlled dosing container according to the present invention with the tamper ring portion being removed.
Figure 27:
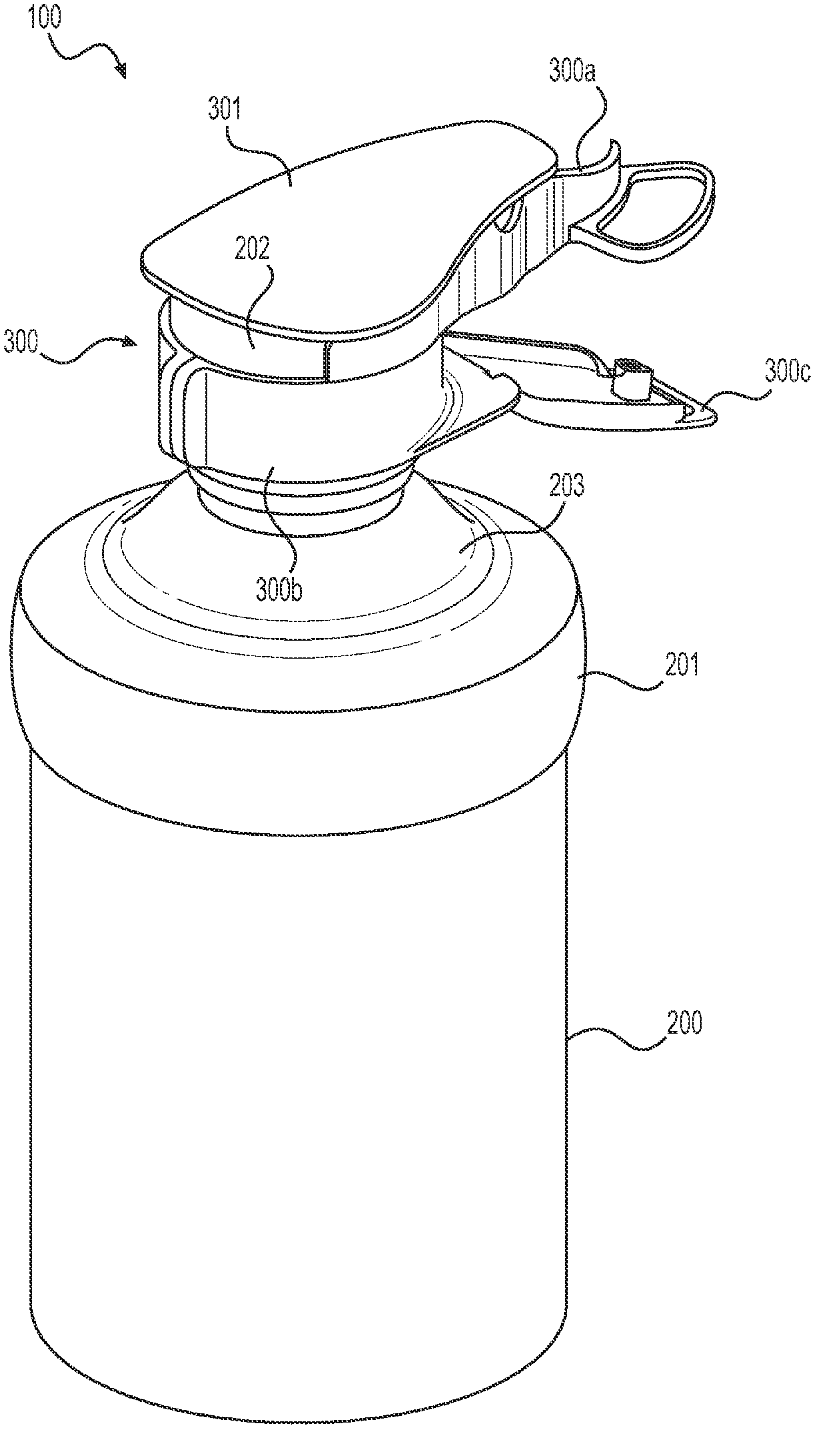
FIG. 27 is a back view of the fourth embodiment of the tamper-proof and controlled dosing container according to the present invention with the tamper ring portion being removed.
Figure 28:
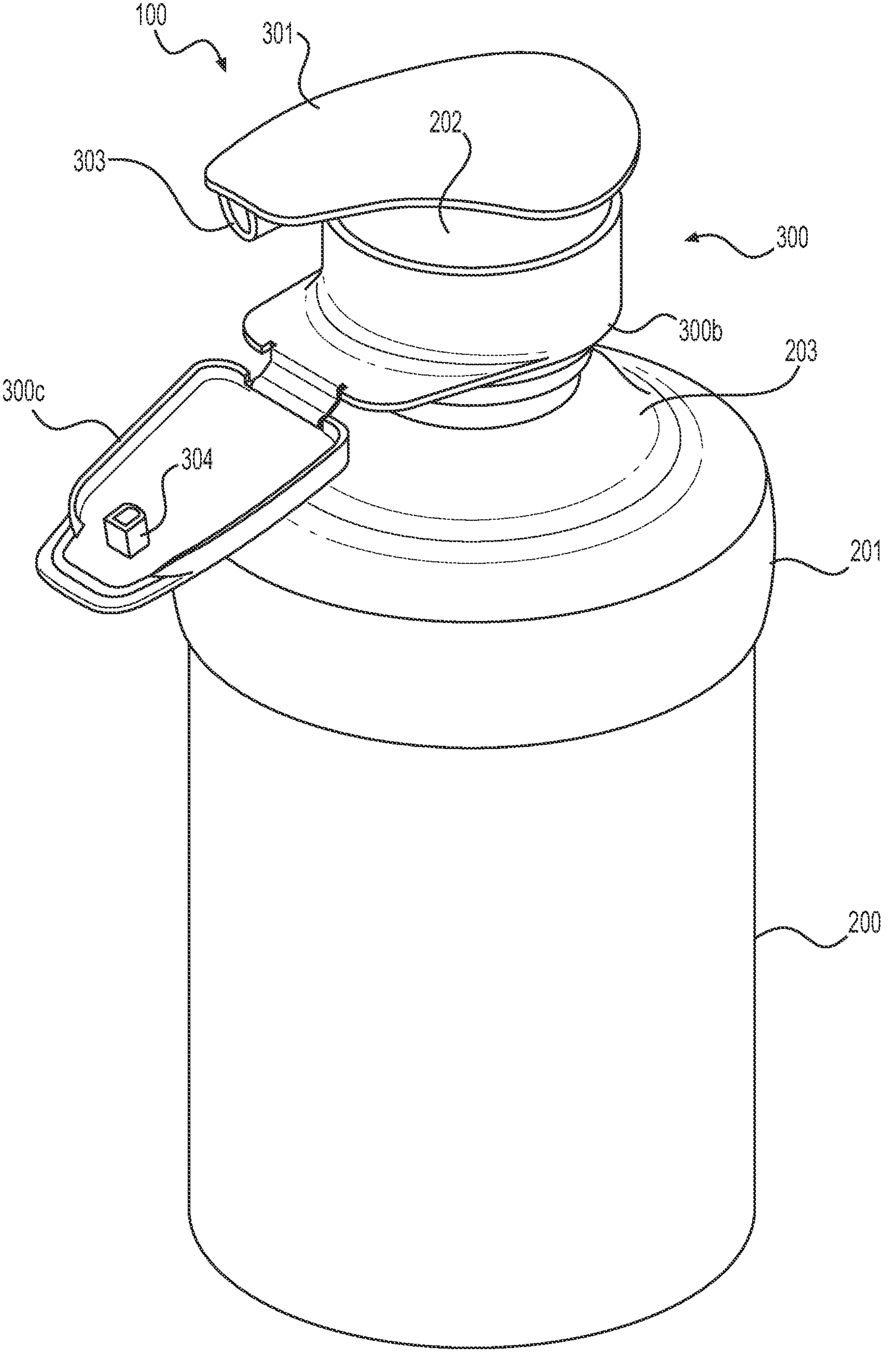
FIG. 28 is a perspective view of the fourth embodiment of the tamper-proof and controlled dosing container according to the present invention with the tamper ring portion and the nozzle plug removed.
Figure 29:
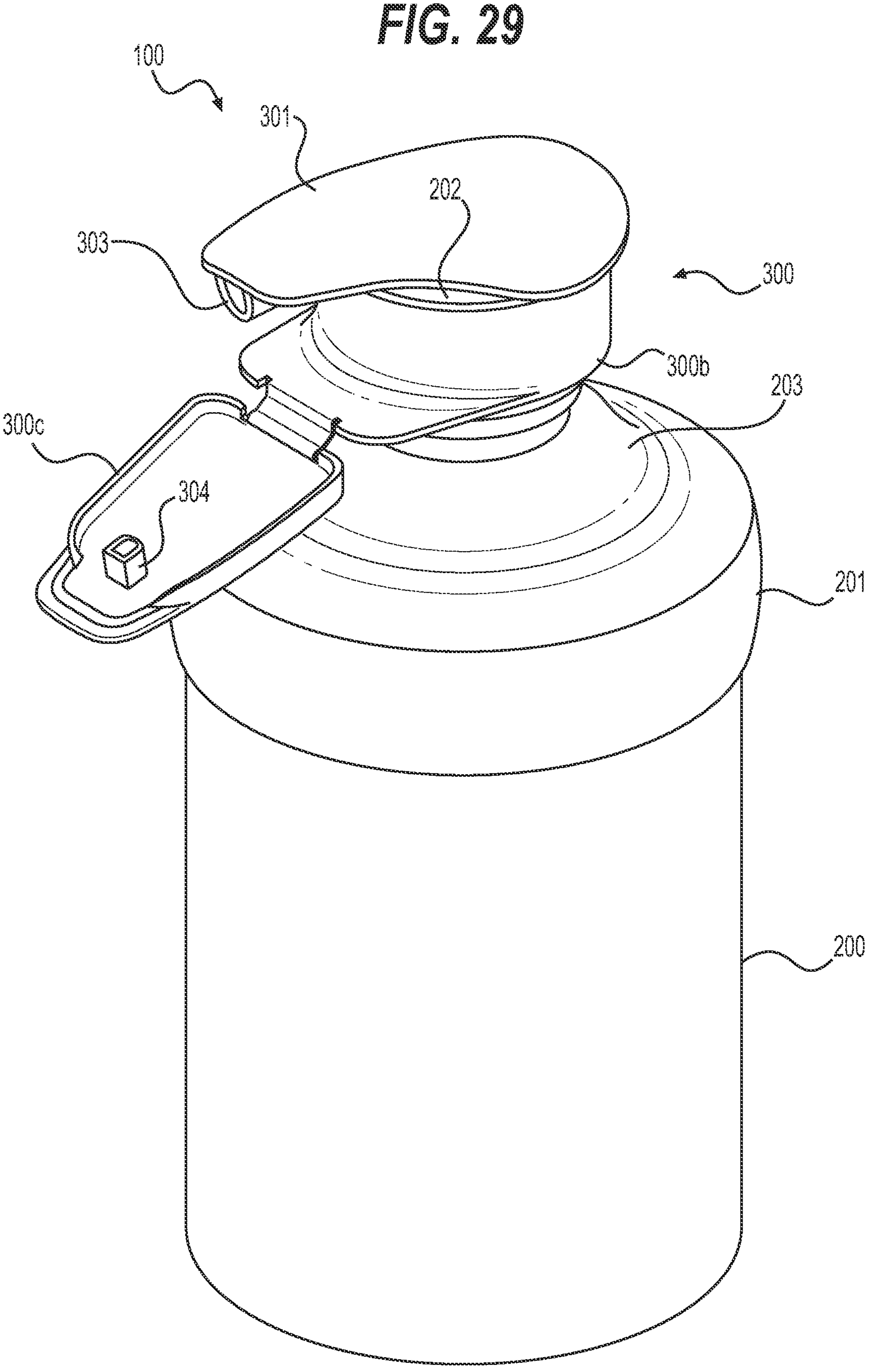
FIG. 29 is a perspective view of the fourth embodiment of the tamper-proof and controlled dosing container according to the present invention with the actuator being depressed.
Figure 30:
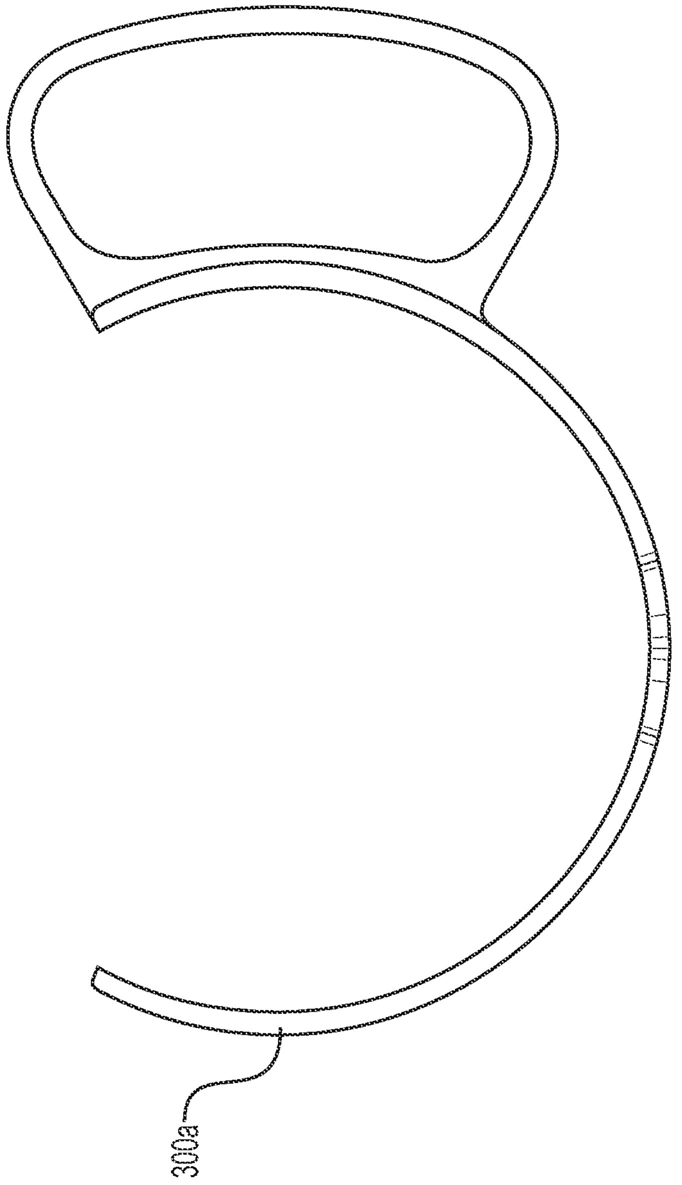
FIG. 30 is a top view of the tamper ring portion according to the fourth embodiment of the present invention.
Figure 31:
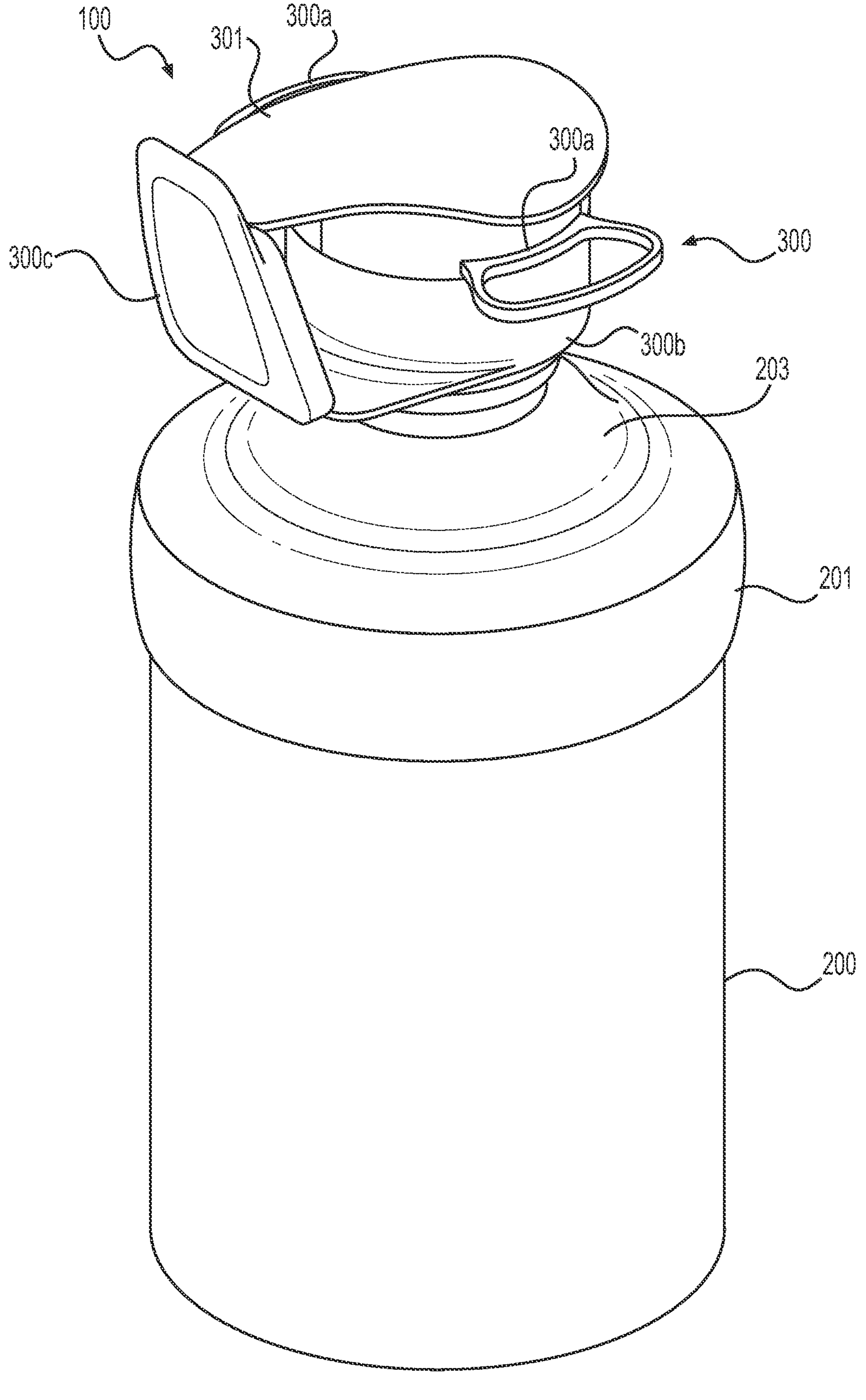
FIG. 31 is a perspective view of a fifth embodiment of the tamper-proof and controlled dosing container of the present invention.
Figure 32:
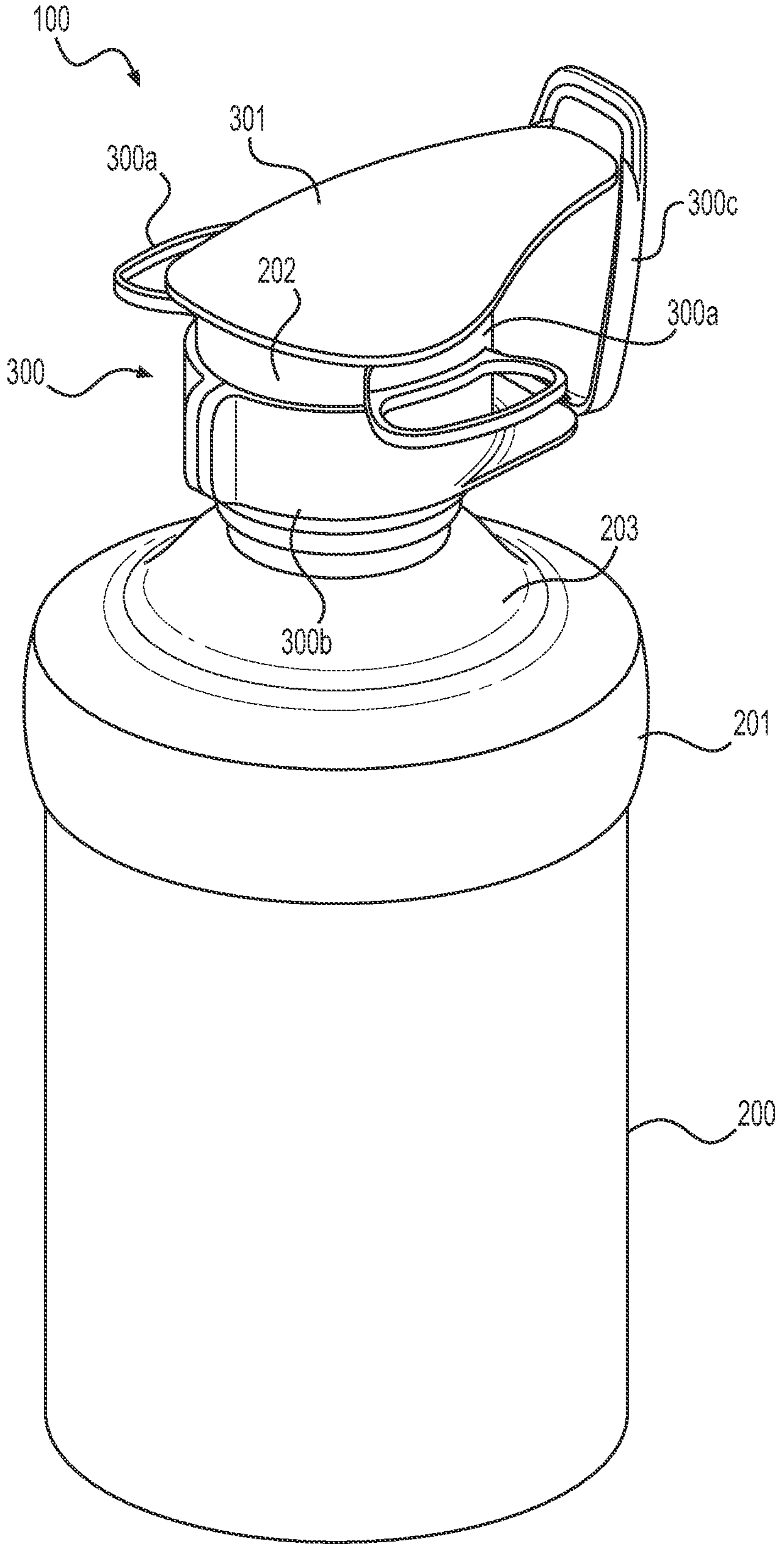
FIG. 32 is a back view of the fifth embodiment of the tamper-proof and controlled dosing container of the present invention.
Figure 33:
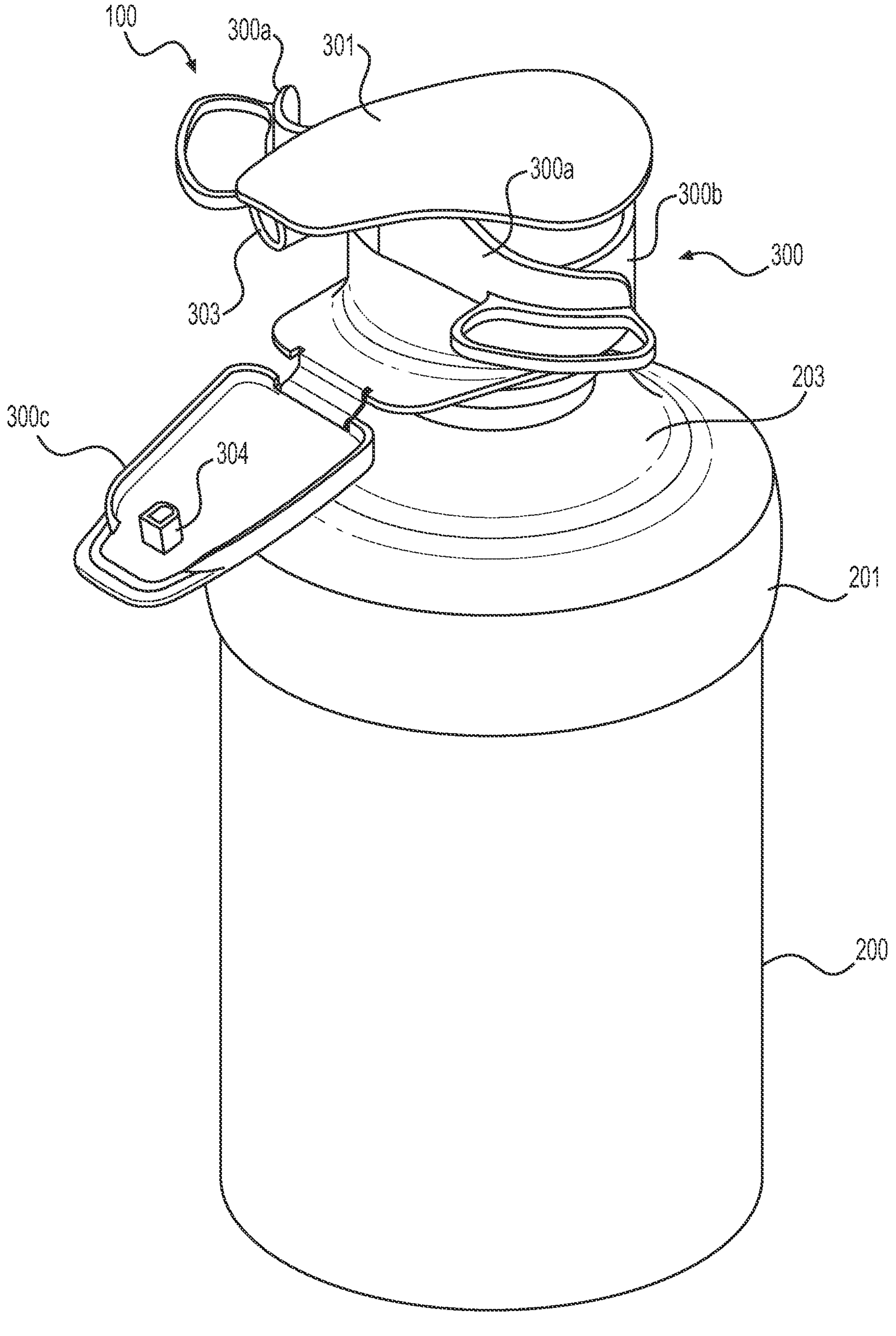
FIG. 33 is a perspective view of the fifth embodiment of the tamper-proof and controlled dosing container of the present invention with the tamper ring portion being removed.
Figure 34:
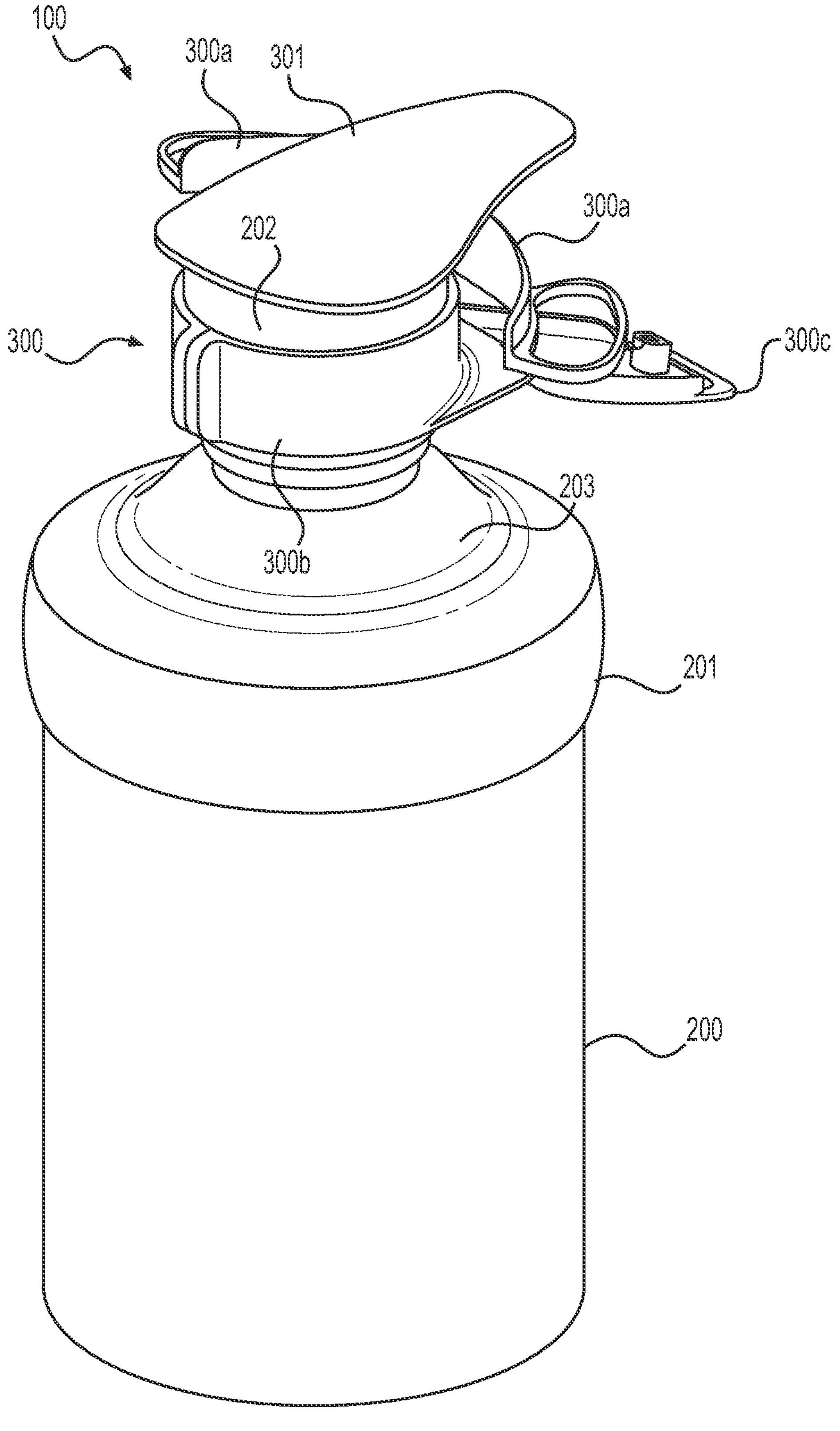
FIG. 34 is a back view of the fifth embodiment of the tamper-proof and controlled dosing container of the present invention with the tamper ring portion being removed.
Figure 35:
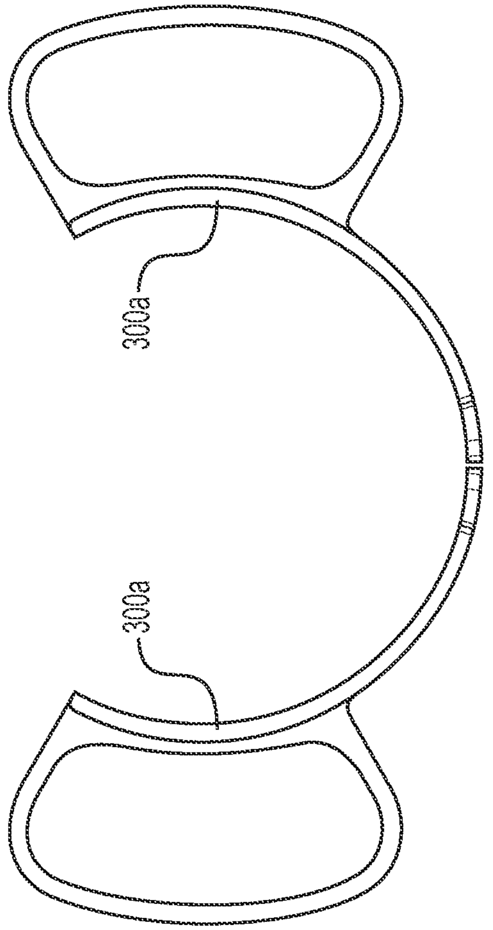
FIG. 35 is a top view of the tamper ring portion according to the fifth embodiment of the present invention.
Figure 36:
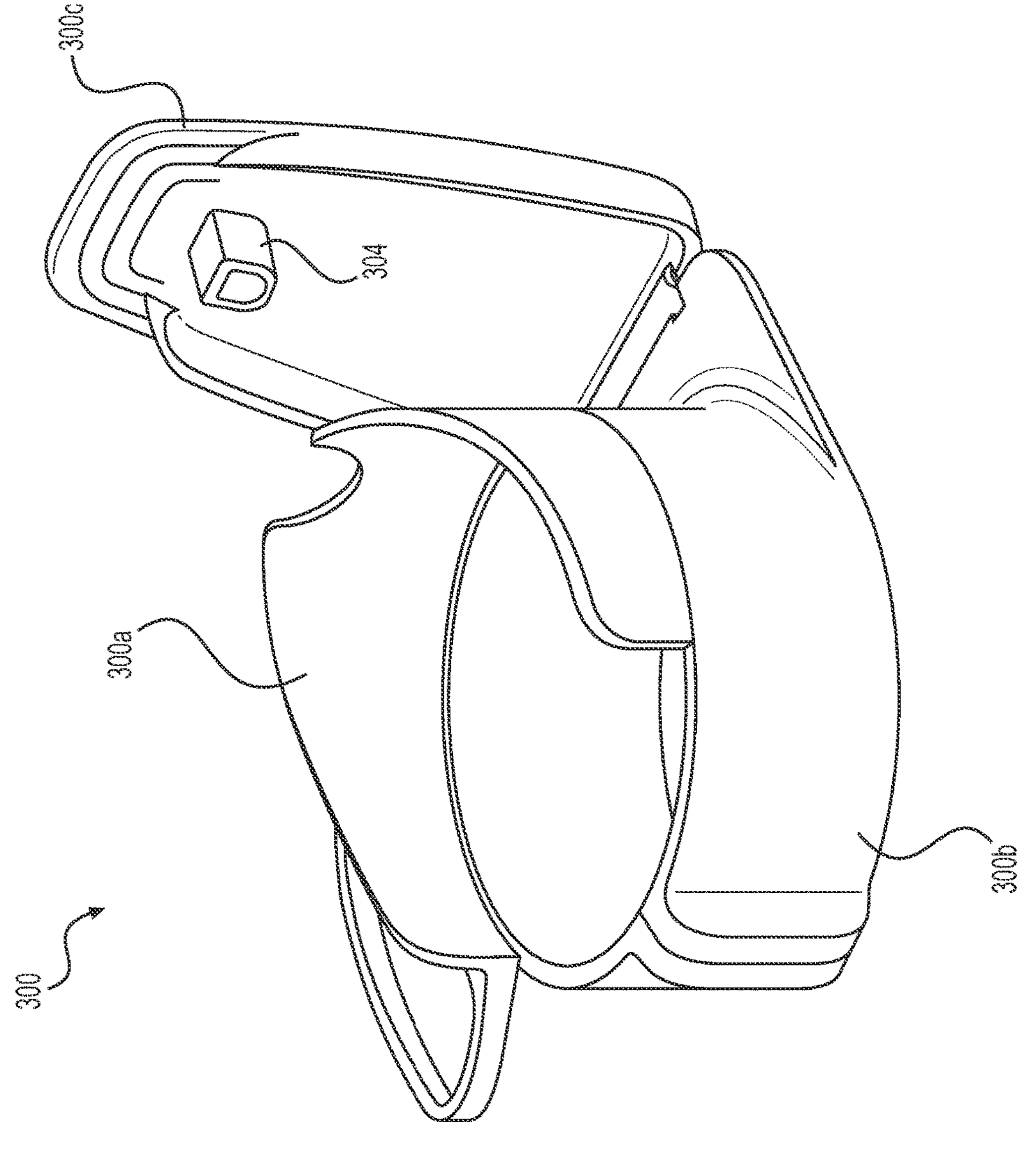
FIG. 36 is a perspective view of the functional ring portion according to the forth embodiment of the present invention.
Figure 37:
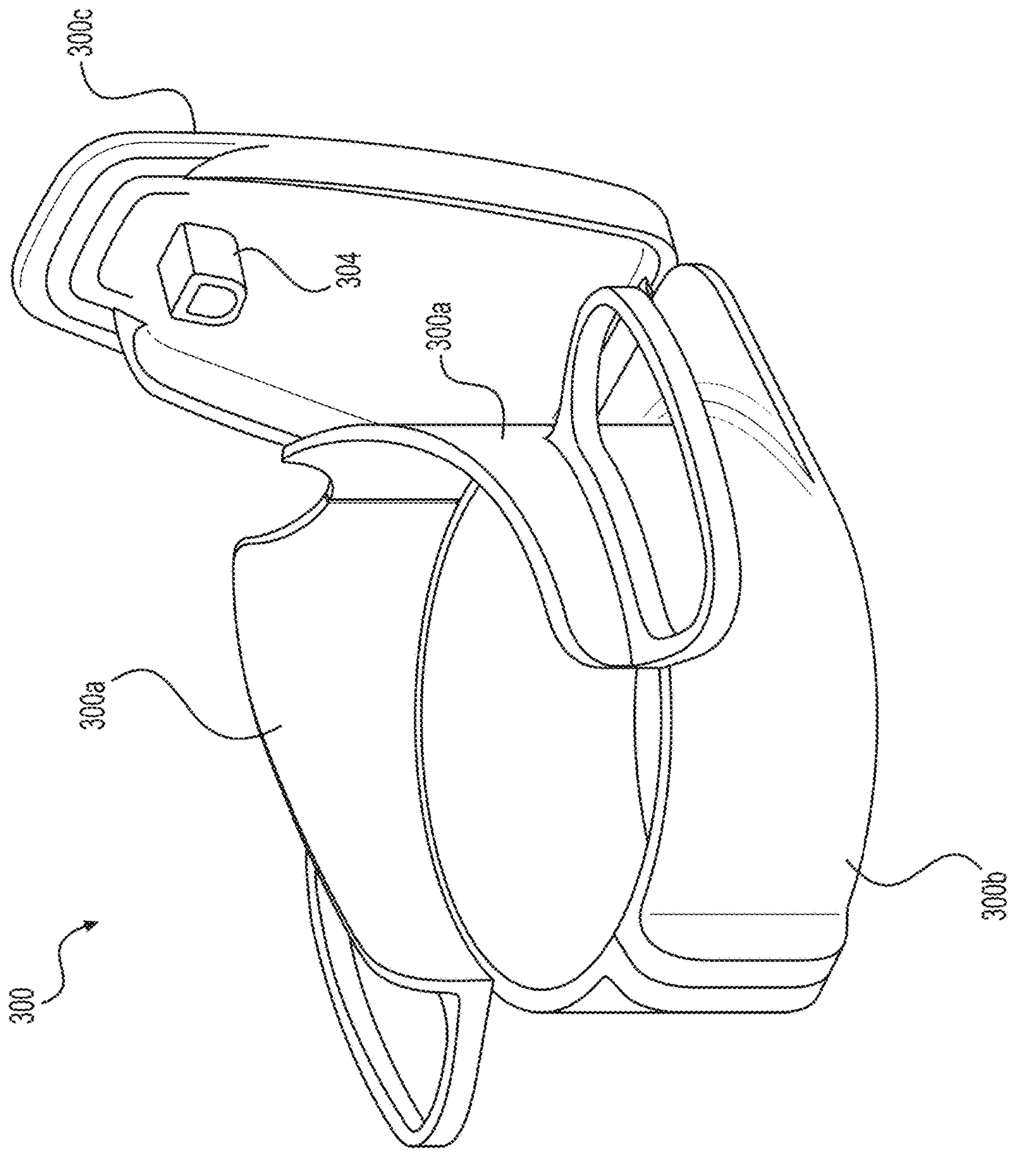
FIG. 37 is perspective view of the functional ring portion according to the fifth embodiment of the present invention.

FIGS. 21 and 22 illustrate a dosing ring portion 300*b* separated from the remainder of the functional ring 300. The dosing ring portion 300*b* is preferably a complete circle and includes the nozzle plug 300*c* attached to a side surface at any point around the dosing ring portion 300*b*.

FIGS. 23-37 illustrate a fourth and fifth embodiment of the present invention. As seen in the figures, the nozzle plug 300*c* includes a substantially rectangular head including a protrusion. The nozzle plug 300*c* is further connected to the dosing ring portion 300*b* of the functional ring 300 by a plate protruding in a substantially perpendicular direction from the dosing ring portion 300*b*. The other aspects of the present invention as depicted in FIGS. 23-37 namely, the container 200, the actuator, the nozzle 301, the orifice 303, the tamper ring portion 300*a* of the functional ring 300, and the dosing ring portion 300*b* of the functional ring 300 all have substantially the same or similar structure and function as described above.

The contents held in the container may be any compound or composition that can be used to cleanse the skin, provide pain relief, or provide overall health and wellness benefits to the user. Non-limiting examples of the contents may include pharmaceutical active ingredients including over the counter actives, behind the counter actives, prescription actives, or any combination thereof.

In an embodiment of the present invention, the contents may be available in various forms and selected from group comprising gel, lotion, cream, oil, emulsion, ointment and powder. In an embodiment, the contents held in the container is a cream or gel containing diclofenac sodium. In a preferred embodiment, the contents held in the container is a combination of diclofenac sodium, ammonia, carbomer homopolymer type c, coco-caprylate/caprate, isopropyl alcohol, mineral oil, polyoxyl 20 cetostearyl ether, propylene glycol, and water While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A tamper-proof and controlled dosing container comprising:

a container including a top portion, a bottom portion, and a side wall portion, the space between the bottom portion and the side wall portion defining an interior space to store contents;

an actuator coupled with the container, the actuator being depressible in a longitudinal direction to drive the contents held in the interior space of the container out of a nozzle protruding horizontally from the actuator; and a functional ring including a tamper ring portion and a dosing ring portion, wherein the actuator abuts a top surface of the dosing ring portion when the actuator is depressed in the longitudinal direction, thereby adjusting the distance the actuator is depressed.

2. The tamper-proof and controlled dosing container of claim 1, wherein the functional ring is provided on a neck of the container below the nozzle.

3. The tamper-proof and controlled dosing container of claim 2, wherein the functional ring occupies the entire length of the neck of the container.

4. The tamper-proof and controlled dosing container of claim 1, wherein the tamper ring portion is provided on the top surface of the dosing ring portion.

5. The tamper-proof and controlled dosing container of claim 4, wherein the tamper ring portion is removably attached to the dosing ring portion and must be removed prior to accessing the contents held in the container for the first time.

6. The tamper-proof and controlled dosing container of claim 1, wherein the function ring includes a nozzle plug extending from the functional ring to the nozzle, and wherein one end of the nozzle plug is permanently affixed to the functional ring and an opposite end of the nozzle plug includes a protrusion for being removably insertable into an orifice of the nozzle.

* * * * *